US012618786B2

(12) United States Patent
Fujita et al.

(10) Patent No.: US 12,618,786 B2
(45) Date of Patent: May 5, 2026

(54) X-RAY IMAGING APPARATUS

(71) Applicant: SHIMADZU CORPORATION, Kyoto (JP)

(72) Inventors: Ryo Fujita, Kyoto (JP); Hiroki Maeda, Kyoto (JP); Naoki Morimoto, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 182 days.

(21) Appl. No.: 18/586,072

(22) Filed: Feb. 23, 2024

(65) Prior Publication Data

US 2024/0402096 A1 Dec. 5, 2024

(30) Foreign Application Priority Data

May 30, 2023 (JP) .................................. 2023-089124

(51) Int. Cl.
*G01N 23/04* (2018.01)
*H05G 1/30* (2006.01)
(52) U.S. Cl.
CPC ............... *G01N 23/04* (2013.01); *H05G 1/30* (2013.01); *G01N 2223/204* (2013.01)

(58) Field of Classification Search
CPC ..... G01N 23/04; G01N 2223/204; H05G 1/30
See application file for complete search history.

(56) References Cited

U.S. PATENT DOCUMENTS 9,922,793 B2 3/2018 Hori et al.
2012/0027173 A1* 2/2012 Duerr .................... H01J 35/065
378/62

FOREIGN PATENT DOCUMENTS

JP 6295254 B2 2/2018

* cited by examiner

*Primary Examiner* — Courtney D Thomas
(74) *Attorney, Agent, or Firm* — Muir Patent Law, PLLC

(57) ABSTRACT

This X-ray imaging apparatus is equipped with an X-ray tube, a detector for detecting X-rays emitted from the X-ray tube and transmitted through the subject, and an image processing unit for generating an image based on a detection signal output from the detector. The X-ray imaging apparatus is provided with a controller configured to cause X-rays to be emitted such that the distance between the plurality of focal positions of the plurality of electron beams on the inclined surface differs as viewed from the subject's side, depending on the size of the subject, by causing a part of the plurality of electron emitters to emit electron beams.

17 Claims, 11 Drawing Sheets

First Embodiment

ZM portion enlarged diagram

Second Embodiment

X2 ← → X1
← X →
⊗ Y1
◉ Y2 } Y
Z1 ↕ Z2 } Z

200

201

91

90

3

9a

2

4 Rotation mechanism

8 Imaging controller

5 Main controller
5a
5b Processing unit
5c Storage unit
5d Image processing unit
I/O Interface 6 Display unit 7 Input unit 13- 13- 13- 13- 13-
13- 13- 13- 13- 13-
13- 13- 13- 13- 13-
13- 13- 13- 13- 13-
13- 13- 13- 13- 13-
13- 13- 13- 13- 13-
13- 13- 13- 13- 13-
13- 13- 13- 13- 13-

212

Z1 ← → Z2
← Z →
X1 ↕ X2
X
⊗ Y1
◉ Y2 } Y

Modification

X-RAY IMAGING APPARATUS

CROSS-REFERENCE TO RELATED APPLICATIONS

The related Japanese Patent Application No. 2023-089124, entitled "X-ray Imaging Apparatus," filed on May 30, 2023, invented by FUJITA Ryo, MAEDA Hiroki, MORIMOTO Naoki, upon which this patent application is based, is hereby incorporated by reference.

BACKGROUND OF THE INVENTION

Field of the Invention

The present disclosure relates to an X-ray imaging apparatus.

Description of the Related Art

The following description sets forth the inventor's knowledge of the related art and problems therein and should not be construed as an admission of knowledge in the prior art.

Conventionally, an X-ray imaging apparatus has been known. Such an X-ray imaging apparatus is disclosed, for example, in Japanese Patent No. 6295254.

The above-described Japanese Patent No. 6295254 discloses an X-ray imaging system (X-ray imaging apparatus). This X-ray imaging system is provided with an imaging device (detector), an X-ray emitting device (X-ray tube), and a driver (controller). The imaging device is configured to detect the X-rays emitted from the X-ray emitting device and transmitted through a target object. Here, the X-ray imaging system generates an image of the target object based on the detection result of the imaging device.

The X-ray emitter disclosed in the above-described Japanese Patent No. 6295254 includes a plurality of electron emission structures, a focusing structure, and an anode.

Each of the plurality of electron emission structures described in the above-described Japanese Patent No. 6295254 has a plurality of electron sources. Each of the plurality of electron emission structures is configured to be controlled by the driver to emit electrons emitted from each of the plurality of electron sources as an electron beam toward an anode. The focusing structure is configured to focus the electron beam to a single focal position on the anode. The plurality of electron emission structures including such a configuration is arranged at a constant pitch on a substrate.

The anode described in the above-described Japanese Patent No. 6295254 is configured to generate X-rays by emitted electrons. The anode is arranged at a position facing each of the plurality of electron emission structures in the irradiation direction of the electron beam. The anode extends in a direction orthogonal to the irradiation direction of the electron beam. The anode is configured to cause the X-rays generated by the irradiated electron beam to transmit the target object.

Here, although not specifically described in the above-described Japanese Patent No. 6295254, in a conventional X-ray imaging system as described in Japanese Patent No. 6295254, in the case where the target object is relatively small in size, it is desirable for the focal positions of the plurality of electron beams to be closer to each other to ensure that the X-rays are incident on the small-sized target object.

Further, in the case where the target object is relatively large in size, it is desirable to separate the focal positions of the plurality of electron beams from each other so that the range of the imaging device where the X-rays from one of the plurality of electron beams hits and the other range of the imaging device where the X-rays from the other electron beam hits are located away from each other.

That is, in the case where the target object is relatively large in size, when the focal position of one electron beam and the focal position of the other electron beam are not distant from each other, similar ranges are irradiated with X-rays. Therefore, depending on the detection accuracy of the imaging device, X-rays may be detected in the same region of the plurality of imaging elements of the imaging device. In such a case, when reconstructing a plurality of images, a position correction is performed even though the positions of the images are aligned. This causes a positional deviation between the images, resulting in blurring of the reconstructed image.

However, in the X-ray imaging system of the above-described Japanese Patent No. 6295254, when imaging a target image, the distances between the focal positions of the plurality of electron beams emitted separately from the plurality of electron emission structures remain unchanged. Therefore, in the case of an object small in size, it may not be possible to assuredly acquire an image of a target object (subject). While, in the case of an object large in size, the reconstructed image of the target object (subject) may be blurred.

SUMMARY OF THE INVENTION

The present disclosure has been made to solve the above-mentioned problems. One object of the present disclosure is to provide an X-ray imaging apparatus capable of assuredly capturing an image of a subject and suppressing the blurring of the subject in a reconstructed image.

In order to attain the above-described object, the X-ray imaging apparatus according to one aspect of the present disclosure includes:

an X-ray tube including a plurality of electron emitters, a focusing unit, and a target, the plurality of electron emitters each having a plurality of electron sources for emitting electron beams, the plurality of electron emitters being arranged linearly on a substrate in each of a first direction and a second direction orthogonal to the first direction, the focusing unit being configured to focus each of a plurality of electron beams emitted separately from the plurality of electron emitters, the target having an inclined surface inclined to emit X-rays generated by each of the plurality of electron beams focused onto a plurality of separate focal positions by the focusing unit;

a detector configured to detect the X-rays emitted from the X-ray tube and transmitted through the subject;

an image processing unit configured to generate an image based on a detection signal output from the detector; and a controller configured to cause X-rays to be emitted such that a distance between the plurality of focal positions of the plurality of electron beams on the inclined surface differs as viewed from a subject's side, depending on a size of the subject, by causing a part of the plurality of electron emitters to emit electron beams.

In the X-ray imaging apparatus according to one aspect of the present disclosure, it is provided with the controller configured to cause X-rays to be emitted such that the distance between the plurality of focal positions of the plurality of electron beams on the inclined surface differs as viewed from the subject's side according to the size of the subject by causing a part of the plurality of electron emitters to emit electron beams.

With this, by causing X-rays to be emitted such that the distance between the plurality of focal positions differs according to the size of the subject, in the case where the subject is relatively small in size, it is possible to reduce the distance between the focal positions on the target's inclined surface in accordance with the size of the subject. Therefore, it is possible to cause a plurality of X-rays generated separately on the target by each of the plurality of electron beams to penetrate the subject and hit the detector. With this, it is possible to assuredly acquire the image of the subject.

Further, in a case where the subject is relatively large in size, the distance between the focal positions of the electron beams can be increased, and therefore, it is possible to avoid having the same detection range in the detector for the X-rays generated from each of the plurality of electron beams. Therefore, the positional deviation between the acquired X-ray images can be suppressed. Consequently, it is possible to suppress the blurring of the subject in the image reconstructed from the X-ray image reflecting the subject. As a result, it is possible to assuredly acquire the image of the subject and suppress the blurring of the subject in the reconstructed image.

BRIEF DESCRIPTION OF THE DRAWINGS

The preferred embodiments of the present disclosure are shown by way of example, and not limitation, in the accompanying figures.

FIG. 2 is a schematic diagram showing the overall configuration of the X-ray imaging apparatus according to the first embodiment, as viewed from above.

DETAILED DESCRIPTION OF THE PREFERRED EMBODIMENTS

Hereinafter, some embodiments of the present disclosure will be described with reference to the attached drawings. Note that, hereinafter, the same or equivalent part in the figures is assigned by the same reference symbol, and the description thereof will not be repeated.

First Embodiment

Initially, referring to FIG. 1 to FIG. 15, the configuration of an X-ray imaging apparatus 100 according to a first embodiment of the present disclosure will be described.

Figure 1:
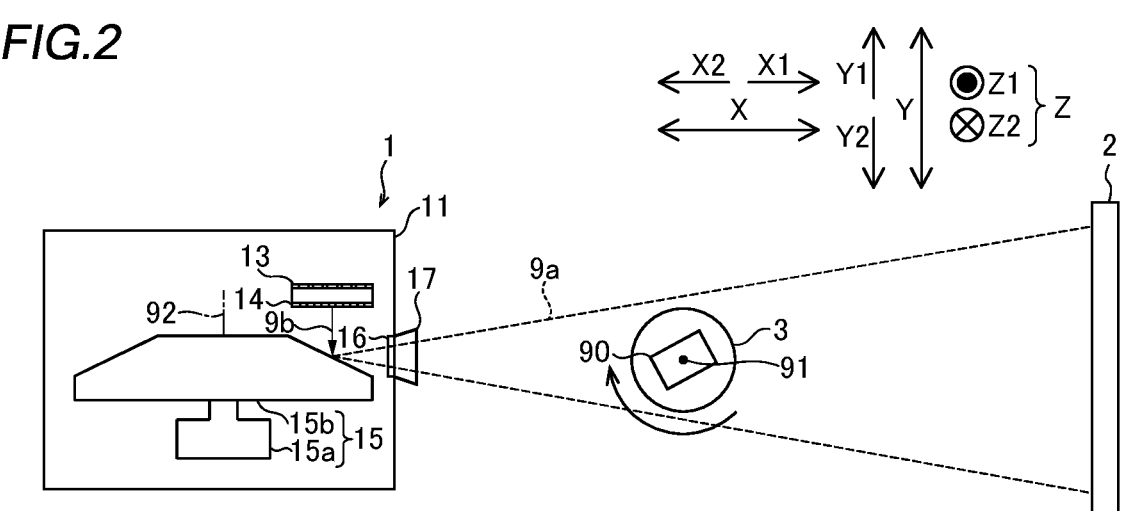
FIG. 1 is a schematic diagram showing the overall configuration of an X-ray imaging apparatus according to a first embodiment.

As shown in FIG. 1, the X-ray imaging apparatus 100 is an apparatus for capturing a CT image of a subject 90. The X-ray imaging apparatus 100 is used, for example, for non-destructive inspection. The subject 90 is, for example, a substrate, an electron component, or the like.

The X-ray imaging apparatus 100 is equipped with an X-ray tube 1, a detector 2, a subject installation portion 3, a rotation mechanism 4, a main controller 5, a display unit 6, an input unit 7, and an imaging controller 8. Note that the imaging controller 8 is one example of the "controller" as recited in claims.

Here, the direction in which the X-ray tube 1 and the detector 2 are arranged is defined as an X-direction, the direction toward the detector 2 in the X-direction is defined as an X1-direction, and the direction toward the X-ray tube 1 in the X-direction is defined as an X2-direction. The vertical direction is defined as a Z-direction, the upward direction in the Z-direction is defined as a Z1-direction, and the downward direction in the Z-direction is defined as a Z2-direction. The X-direction and the Z-direction are orthogonal to each other. The direction orthogonal to the X-direction and the Z-direction is defined as a Y-direction, the one direction in the Y-direction is defined as a Y1-direction, and the other in the Y-direction is defined as a Y2-direction.

Note that the X-direction is one example of the "first direction" recited in claims. Note that the Z-direction is one example of the "second direction" recited in claims. Also note that the X1-direction is one example of the "irradiation direction" recited in claims.

The X-ray tube 1 is configured to irradiate the subject 90 placed on the subject installation portion 3 with X-rays 9a. The X-ray tube 1 is configured to generate X-rays 9a when a high voltage is applied. The X-ray tube 1 faces the detector 2 via the subject installation portion 3 in the X-direction. The X-ray tube 1, the subject installation portion 3, and the detector 2 are arranged side by side in the X-direction (horizontal direction). Note that the detailed configuration of the X-ray tube 1 will be described later.

The detector 2 is configured to detect the X-rays 9a emitted from the X-ray tube 1 and transmitted through the subject 90. The X-rays 9a emitted from the X-ray tube 1 are incident on the detection surface of the detector 2. At this time, the subject 90 is detected by the X-rays 9a transmitted through the subject 90. The detector 2 is configured to convert the detected X-rays 9a into electric signals (detection signals). The detection signals detected by the detector 2 are transmitted to the main controller 5. With this, processing is performed by the main controller 5 to acquire an X-ray image of the subject 90.

The detector 2 is, for example, an FPD (Flat Panel Detector). The detector 2 includes a plurality of conversion elements (not illustrated) and pixel electrodes (not illustrated) arranged on the plurality of conversion elements. The plurality of conversion elements is arranged in a matrix on the detection surface at a predetermined period (pixel pitch). Further, the plurality of pixel electrodes is arranged in a matrix on the detection surface in accordance with the positions of the plurality of conversion elements.

The subject installation portion 3 is configured to install the subject 90 thereon. The subject installation portion 3 is a subject stage. The subject installation portion 3 is placed between the X-ray tube 1 and the detector 2.

The rotation mechanism 4 is configured to rotate the subject installation portion 3 about the rotation center axis 91, which extends in the Z-direction. In other words, the rotation mechanism 4 is configured to rotate the subject installation portion 3 relative to the X-ray tube 1 and the detector 2. With this, the rotation mechanism 4 can change the imaging angle of the subject 90 based on the signals from the imaging controller 8.

The main controller 5 is configured to control the imaging of the subject 90 with the X-ray imaging apparatus 100. The main controller 5 includes a processing unit 5a, a storage unit 5b, an image processing unit 5c, and an I/O Interface 5d.

The processing unit 5a is a processor such as a CPU (Central Processing Unit). The storage unit 5b includes an SSD (Solid State Drive), an HDD (Hard Disk Drive), a ROM (Read Only Memory), a RAM (Random Access Memory), and the like.

The image processing unit 5c is a processor, such as, e.g., a GPU (Graphics Processing Unit) and an FPGA (Field-Programmable Gate Array) configured for image processing.

The image processing unit 5c is configured to acquire detection signals detected by the detector 2 from the detector 2 at each of a plurality of preset imaging angles with respect to the subject 90, which is to be rotated by the rotation mechanism 4. The image processing unit 5c is configured to generate an X-ray image at each of the plurality of imaging angles, based on the detection signal at each of the plurality of imaging angles. The image processing unit 5c is configured to generate a CT image by executing reconstruction processing of a plurality of X-ray images captured at each of the plurality of imaging angles for one rotation.

In this way, a CT image is generated by reconstruction processing based on a plurality of X-ray images captured at various imaging angles. The CT image is a tomographic image of the subject 90 or an image reflecting the three-dimensional structure of the subject 90, such as a three-dimensional stereoscopic image. As the reconstruction processing, processing such as a successive approximation method may be used as necessary. Note that a CT image is one example of the "image" as recited in claims.

Each of the X-ray images and CT images generated by the image processing unit 5c is stored in the storage unit 5b.

The I/O Interface 5d is composed of various interfaces for inputting and outputting signals to and from the main controller 5. The I/O Interface 5d is connected to each of the display unit 6 and the input unit 7. The display unit 6 is, for example, a liquid crystal display. The input unit 7 is a device, such as, e.g., a keyboard and a mouse. The main controller 5 is configured to acquire detection signals from the detector 2 via the I/O Interface 5d. The main controller 5 is configured to transmit instructions to start or stop imaging, etc., to the imaging controller 8 via the I/O Interface 5d.

The imaging controller 8 is a driver for controlling the X-ray tube 1, based on the irradiation control information on the X-ray tube 1 when imaging the subject 90, the irradiation control information being transmitted from the main controller 5. Further, the imaging controller 8 is also a driver for controlling the rotation mechanism 4, based on the rotation control information on the rotation mechanism 4 when imaging the subject 90, the rotation control information being transmitted from the main controller 5. Note that the control of the X-ray tube 1 by the imaging controller 8 will be described after describing the detailed configuration of the X-ray tube 1.

(Detailed Configuration of X-Ray Tube)

As shown in FIG. 2, the X-ray tube 1 includes a vacuum container 11, a substrate 12 (see FIG. 3), a plurality of electron emitters 13, a focusing unit 14, a rotary target 15, an X-ray transmission window 16, and a collimator 17. The vacuum container 11 has a vacuum space therein. In the vacuum container 11, the substrate 12, a plurality of electron emitters 13, and the focusing unit 14 are accommodated.

Figure 3:
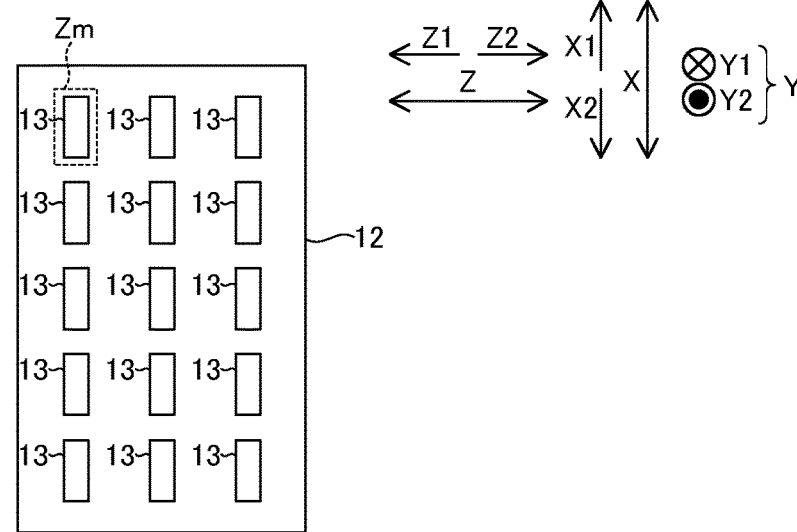
FIG. 3 is a schematic diagram showing a plurality of electron emitters on a substrate of the X-ray imaging apparatus according to the first embodiment.

As shown in FIG. 3, the substrate 12 is a plate-like member made of silicon or glass. A plurality (15 in this embodiment) of electron emitters 13 is formed on the Y1-direction side surface of the substrate 12. Note that two, or four or more electron emitters 13 may be formed on the surface of the substrate 12 in the Z-direction. Further, four, or six or more electron emitters 13 may be formed on the surface of the substrate 12 in the X-direction.

<Electron Emitter>

Each of the plurality of electron emitters 13 is configured to emit an electron beam 9b (see FIG. 4) when a voltage is applied. The plurality of electron emitters 13 is arranged linearly in each of the X-direction and the Z-direction on the substrate 12. The plurality of electron emitters 13 is arranged in a matrix as viewed from the Y2-direction side. Since each of the plurality of electron emitters 13 has the same structure, only the electron emitter 13 located at the Zm portion shown in FIG. 3 will be described.

Figure 4:
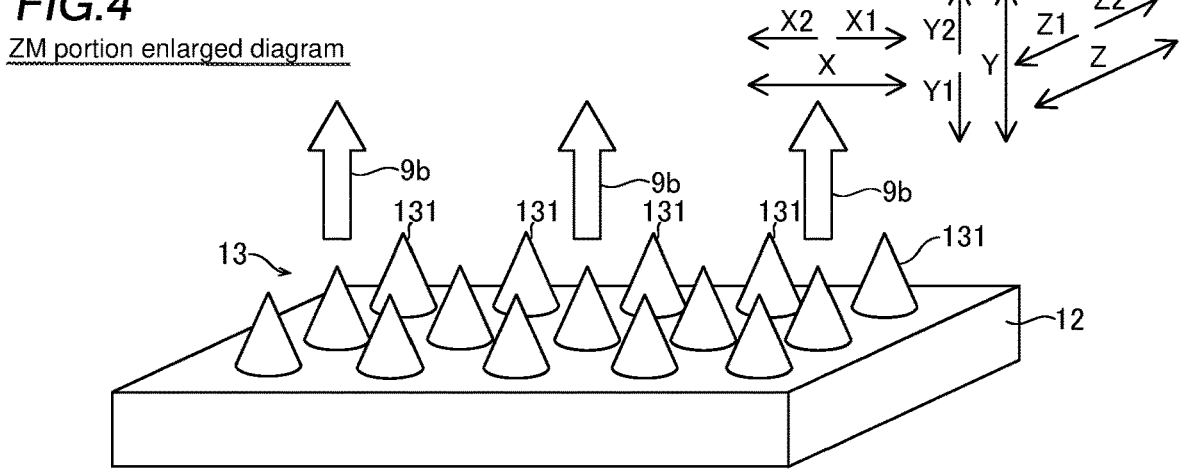
FIG. 4 is an enlarged perspective view of a Zm portion in FIG. 3.

As shown in FIG. 4, the electron emitter 13 has a gate electrode (not illustrated), an insulating layer (not illustrated), and a plurality of electron sources 131. Each of the gate electrode, the insulating layer, and the electron source 131 is formed integrally on the substrate 12 by etching. The gate electrode is configured to generate an electric field to emit electrons from each of the plurality of electron sources 131 when a voltage is applied. The insulating layer is configured to surround each of the plurality of electron sources 131, thereby insulating each of the plurality of electron sources 131.

Each of the plurality of electron sources 131 is configured to emit electrons by the tunneling effect of the electric field generated by the voltage applied to the gate electrode in order to emit the electron beam 9b from the electron emitter 13. Each of the plurality of electron sources 131 is a spint-type electron source having a cone shape. Each of the plurality of electron sources 131 is also referred to as "emitter." In FIG. 4, for convenience of explanation, 15 pieces of electron sources 131 are illustrated, but 100 or more, or 1,000 or more pieces of electron sources 131 are provided in the electron emitter 13. With this, although the X-rays 9a generated by the electron beam 9b emitted from a single electron source 131 are weak, a desired intensity of the X-rays 9a is emitted by generating X-rays 9a by the electron beams 9b emitted from a large number (100 or more, or 1,000 or more) of electron sources 131.

As shown in FIG. 3 and FIG. 4, such a plurality of electron sources 131 is arranged in a rectangular shape with the X1-direction as the longitudinal direction when viewed from the Y2-direction side.

<Focusing Unit>

Figure 5:
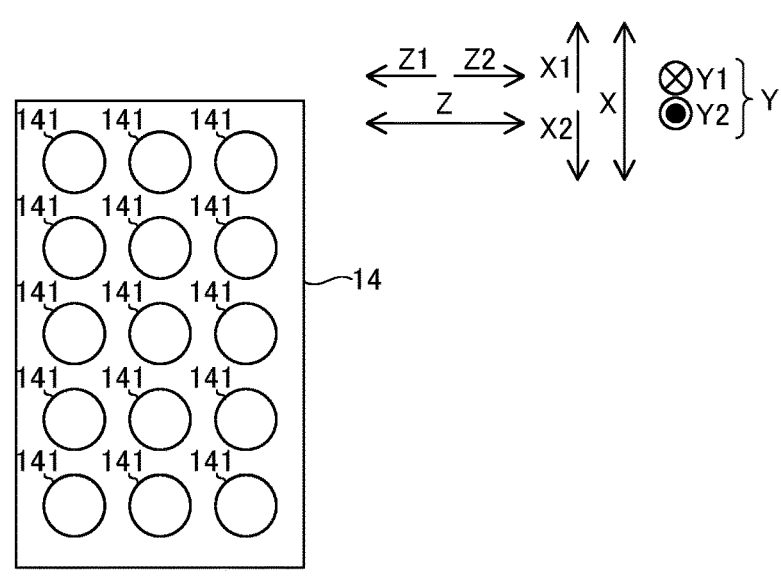
FIG. 5 is a schematic diagram showing a focusing unit of the X-ray imaging apparatus according to the first embodiment.
Figure 6:
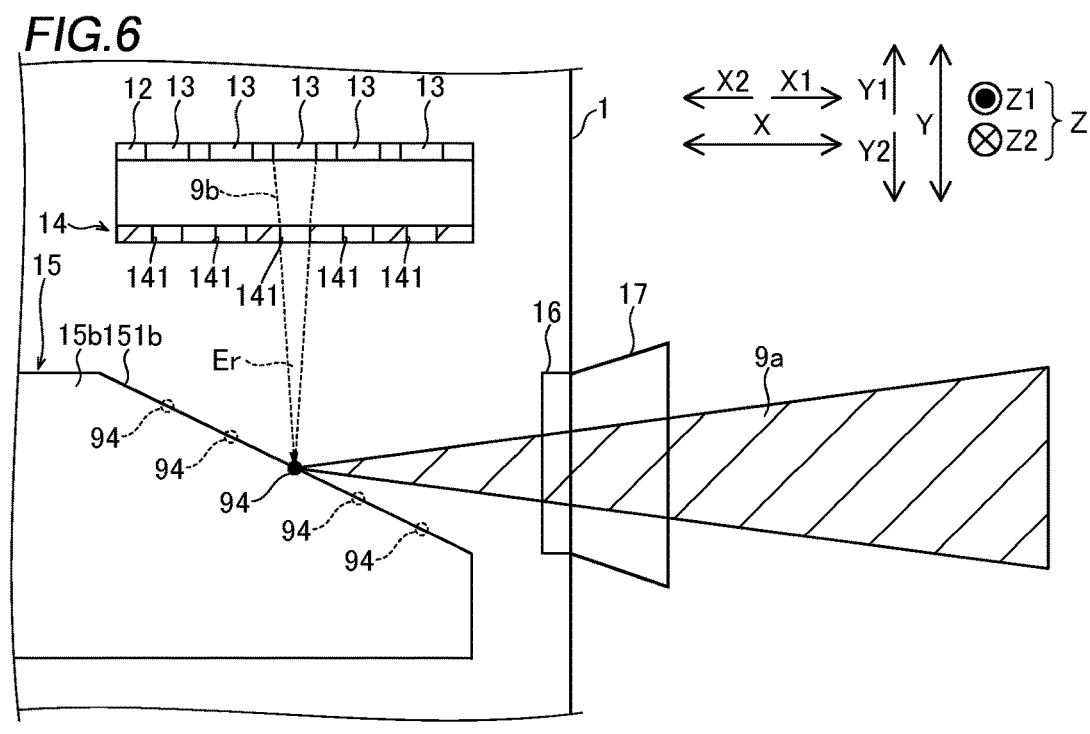
FIG. 6 is a side view showing an electron beam emitted to an inclined surface of a target and X-rays emitted by the electron beam of the X-ray imaging apparatus according to the first embodiment.

As shown in FIG. 5 and FIG. 6, the focusing unit 14 is configured to focus a plurality of electron beams 9b emitted separately from each of the plurality of electron emitters 13. The focusing unit 14 is an optical lens with a plurality (15 in this embodiment) of lens portions 141.

Note that the types of optical lenses include, for example, an electromagnetic lens, an electrostatic lens, and a focusing electrode. Each of the plurality of lens portions 141 has a through-hole that penetrates the focusing unit 14. Each of the plurality of lens portions 141 is configured to impart an electric or magnetic field to the electron beam 9b passing the through-hole that penetrates the focusing unit 14. In each of the plurality of lens portions 141, the electron beam 9b passing the through-hole is focused by the attraction and repulsion forces caused by the electric or magnetic field. Further, the number of the plurality of lens portions 141 may be 2 to 14, or even 15 or more, as long as the number of lens portions matches the number of electron emitters 13.

The plurality of lens portions 141 individually faces the plurality of electron emitters 13, respectively, in the Y-direction. The plurality of lens portions 141 is arranged to separately face the plurality of certain electron emitters 13 aligned in the X-direction, respectively, and separately face the plurality of other electron emitters 13 aligned in the Z-direction out of the plurality of electron emitters 13, respectively. The plurality of lens portions 141 is arranged in a matrix in the focusing unit 14 to match the arrangement positions of the plurality of electron emitters 13.

[Rotary Target]

As shown in FIG. 6, the rotary target 15 is configured to be irradiated with the electron beams 9b while rotating about the rotation center axis 92 (see FIG. 2) that extends in the Z-direction (the direction in which the focusing units 14 and the target 15b described below are arranged). Specifically, the rotary target 15 is composed of a rotation driving mechanism 15a (see FIG. 2) and a target 15b. The rotation driving mechanism 15a has a drive source and a drive power transmission mechanism for rotating the target 15b.

The target 15b is an anode member made of, e.g., molybdenum, rhodium, or tungsten to generate X-rays 9a upon collision of electron beams 9b. The target 15b has a conical trapezoidal shape with a decreasing radius toward the Y1-direction side, as viewed from the Z1-direction side. The target 15b has an inclined surface 151b inclined toward the Y2-direction, which intersects the X1-direction, in the cross-section along the X-direction. The inclined surface 151b is inclined to irradiate the subject 90 with the X-rays 9a generated by each of the plurality of electron beams 9b focused by the focusing unit 14 at a plurality of separate focal positions 94. The plurality of focal positions 94 on the inclined surface 151b is provided to be within the X-ray transmission window 16 when viewed from the X1-direction side (subject 90 side).

Note that FIG. 6 shows, for convenience of explanation, a state in which a single electron beam 9b is emitted from a certain electron emitter 13 positioned in the middle of a plurality of electron emitters 13 arranged in the X-direction.

<X-Ray Transmission Window and Collimator>

The X-ray transmission window 16 is configured so that the X-rays 9a emitted from the target 15b pass through the X-ray irradiation window. The collimator 17 is a component to narrow the irradiation range of the X-rays 9a transmitted through the X-ray transmission window 16 and emitted toward the X1-direction.

(Detailed Configuration of Imaging Controller)

Figure 7:
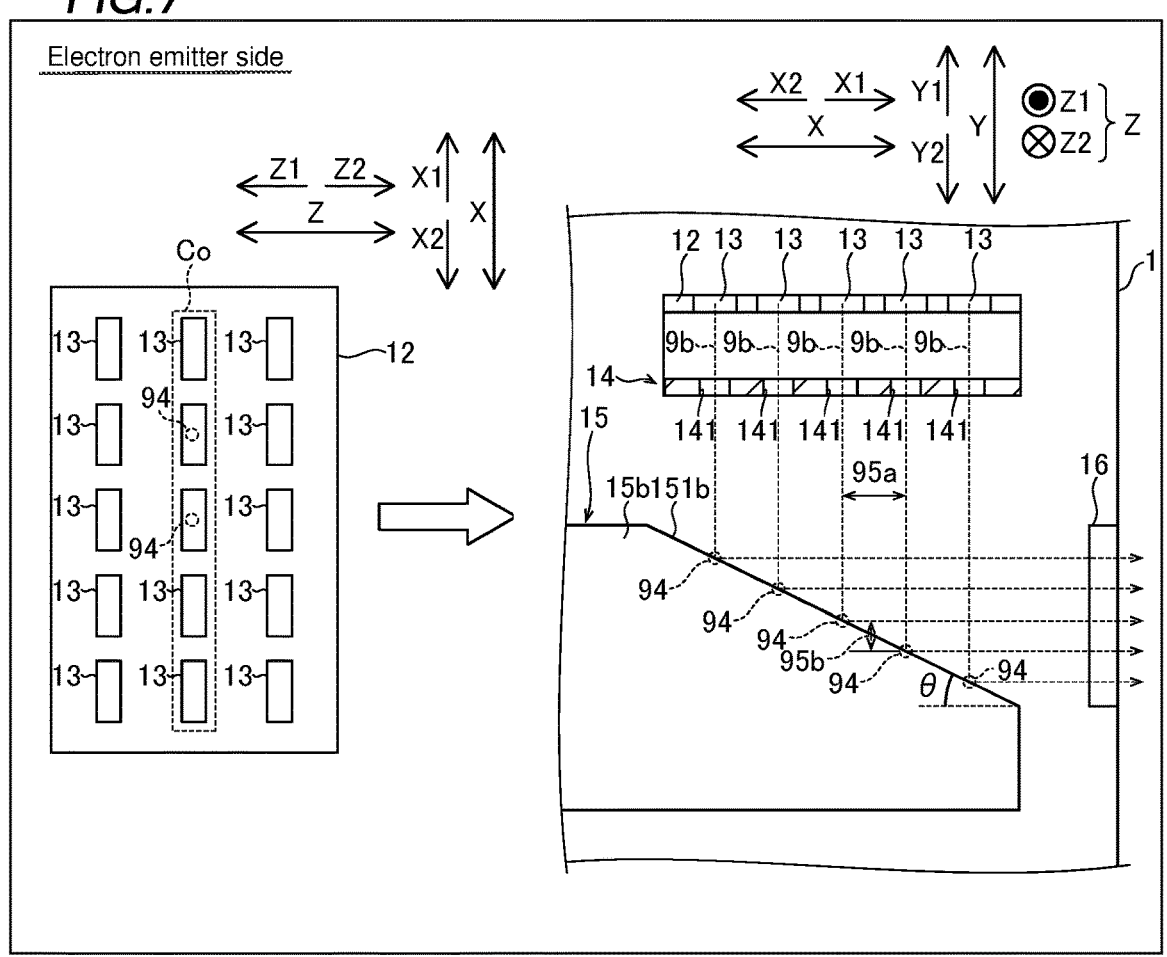
FIG. 7 is a schematic diagram showing a focal position on the side of certain electron emitter and the focal position on the inclined surface of the target of the X-ray imaging apparatus according to the first embodiment.
Figure 8:
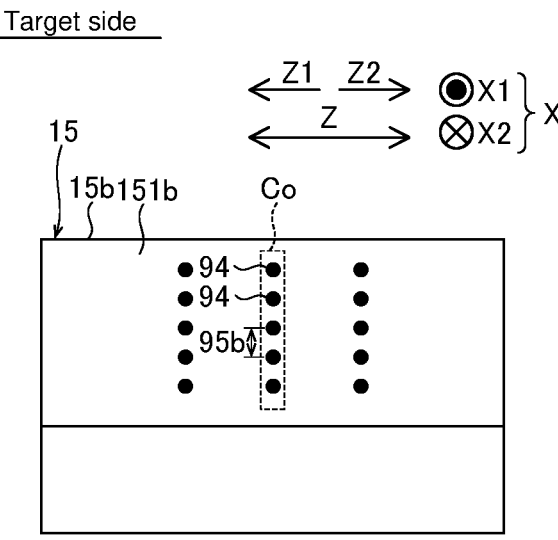
FIG. 8 is a side view of the focal positions on the inclined surface of the target of the X-ray imaging apparatus according to the first embodiment, as viewed from the subject's side.
Figure 9:
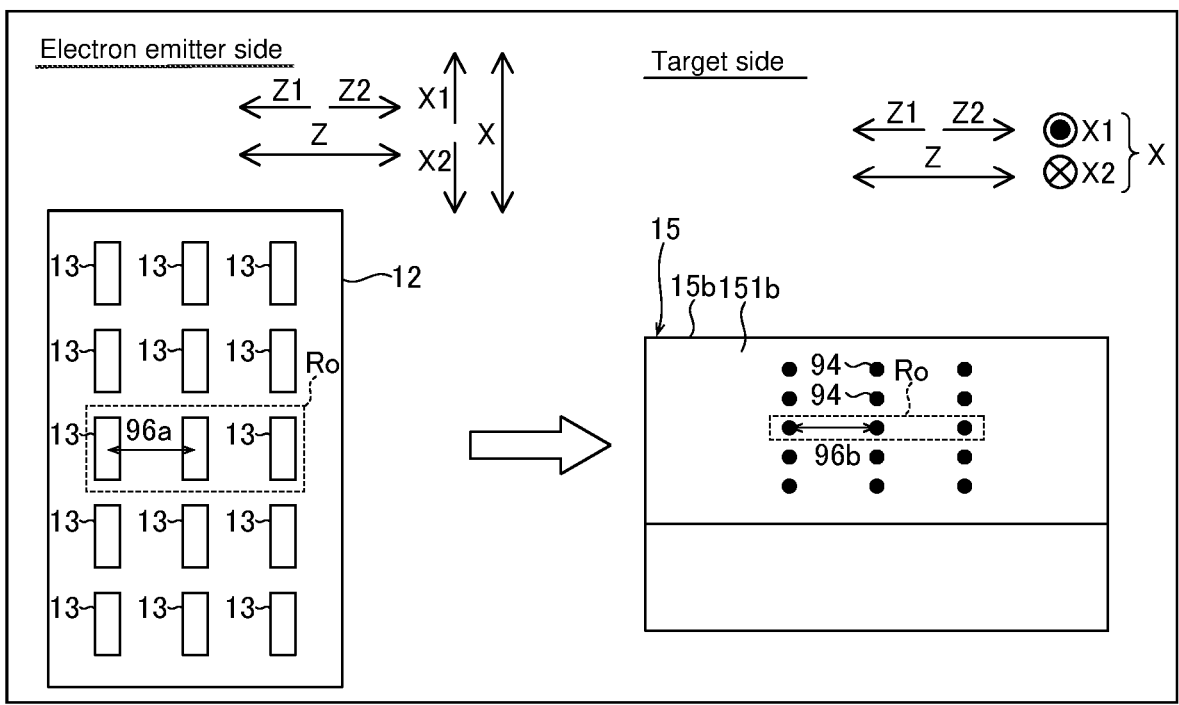
FIG. 9 is a schematic diagram showing the focal positions on the side of other electron emitters and the focal positions on the inclined surface of the target of the X-ray imaging apparatus according to the first embodiment.

As shown in FIG. 7 to FIG. 9, the imaging controller 8 of the first embodiment is configured to perform control to cause X-rays 9a to be emitted by causing electron beams 9b to be emitted from a part of the plurality of electron emitters 13 so that the distance between the plurality of focal positions 94 of the plurality of electron beams 9b on the inclined surface 151b (the distance 95b in FIG. 8 and the distance 96b in FIG. 9) as viewed from the subject 90 (from the X1-direction side) differs depending on the size of the subject 90.

In other words, the imaging controller 8 is configured to perform control to cause electron beams 9b to be emitted from at least one of the plurality of certain electron emitters 13 aligned in the X-direction and the plurality of other electron emitters 13 aligned in the Z-direction, based on the irradiation pattern included in the irradiation control information transmitted from the X-ray tube 1, while rotating the target 15b. Irradiation patterns have been stored in advance in the storage unit 5b. The irradiation pattern is information included in the irradiation control information transmitted from the main controller 5 to the imaging controller 8.

<Distance Between Focal Positions>

Hereinafter, the distance between the plurality of focal positions 94 differs will be described.

As shown in FIG. 7, in each of the plurality of electron emitters 13 on the substrate 12, the center point in the X-direction and in the Z-direction is the focal position 94 on the substrate 12. Here, for the sake of explanation, the plurality of certain electron emitters 13 in the Co row arranged in the X-direction out of the plurality of electron emitters 13 on the substrate 12 will be described.

On the substrate 12, the distance between the focal positions 94 of the plurality of certain electron emitters 13 in the Co row is a distance 95a. Here, the inclined surface 151b is inclined toward the Y1-direction relative to the X-direction by the angle θ. Therefore, as shown in FIG. 7 and FIG. 8, the distance 95b between the focal positions 94 of the plurality of certain electron emitters 13 in the Co column on the inclined surface 151b is a numerical value obtained by multiplying the distance 95a by tan θ. Thus, the distance 95b is smaller than the distance 95a. Here, the inclination angle θ is less than 45 degrees.

As shown in FIG. 9, in each of the plurality of electron emitters 13 on the substrate 12, the center point in the X-direction and in the Z-direction is the focal position 94 on the substrate 12. Here, for the sake of explanation, the plurality of other electron emitters 13 in the Ro row arranged in the Z-direction out of the plurality of electron emitters 13 on the substrate 12 will be described.

On the substrate 12, the distance between the focal positions 94 of the plurality of other electron emitters 13 in the Ro row is a distance 96a. The distance 96a is the same as the distance 95a. Here, in the inclined surface 151b, the Ro row range in the Z-direction is approximately a flat surface. Therefore, on the inclined surface 151b, the plurality of electron emitters 13 is arranged approximately linearly, so that the distance 96b between the focal positions 94 of the plurality of electron emitters 13 in the Ro row is the same as the distance 96a. As an example, in the case where each of the distances 95a and 96a is 2.5 mm, and the inclination angle θ is 10 degrees, the distance 95b is 0.44 mm, and the distance 96b is 2.5 mm.

In this way, in the X-ray tube 1, the distance 96a and the distance 95a on the substrate 12 are the same, but the distance 96b and the distance 95b on the inclined surface 151b are differentiated by utilizing the inclined angle θ of the inclined surface 151b.

Therefore, in the case of emitting an electron beam 9b from each of the plurality of certain electron emitters 13, it is possible to shorten the distance between the focal positions 94 to the distance 95b to emit the X-rays 9a in a similar irradiation range. Further, in the case of emitting an electron beam 9b from each of the plurality of other electron emitters 13, the distance between the focal positions 94 remains unchanged at the distance 96b, so the overlapping range between the irradiation ranges can be reduced.

As described above, the X-ray tube 1 realizes that the distance between the focal positions 94 is changed to the distance 95b and the distance 96b without changing the focal position 94 of the plurality of electron emitters 13 by an electric field or a magnetic field generated in the focusing unit 14. Therefore, the generation of aberration at the focal position 94 can be suppressed. Further, since the configuration is not realized by increasing the number of through-holes of the plurality of lens portions 141 so that the distance between the focal positions 94 becomes the distance 95b and the distance 96b, the reduction in the mechanical strength of the focusing unit 14 can be suppressed by the reduced number of through-holes.

<Irradiation Pattern>

Next, referring to FIG. 10 to FIG. 15, the distance between the plurality of focal positions 94 differs in the irradiation pattern according to the size of the subject 90 will be described. In other words, the imaging controller 8 is configured to perform control to cause the electron beam 9b to be emitted from at least any one of a plurality of certain electron emitters 13 arranged linearly in the X1-direction (irradiation direction of X-rays 9a traveling from the inclined surface 151b to the subject 90) and a plurality of other electron emitters 13 arranged linearly in the Z-direction (direction orthogonal to the irradiation direction), as a part of the plurality of electron emitters 13 arranged in a matrix, based on the irradiation pattern of the plurality of electron emitters 13 according to the size of the subject 90.

<In the Case of Small Subject>

Figure 10:
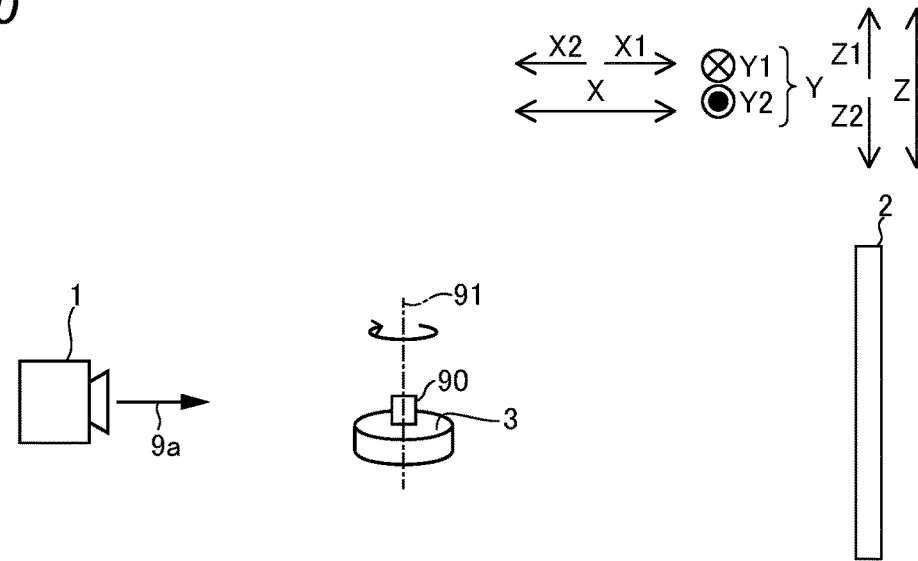
FIG. 10 is a schematic diagram showing a case of imaging a small subject with the X-ray imaging apparatus according to the first embodiment.
Figure 11:
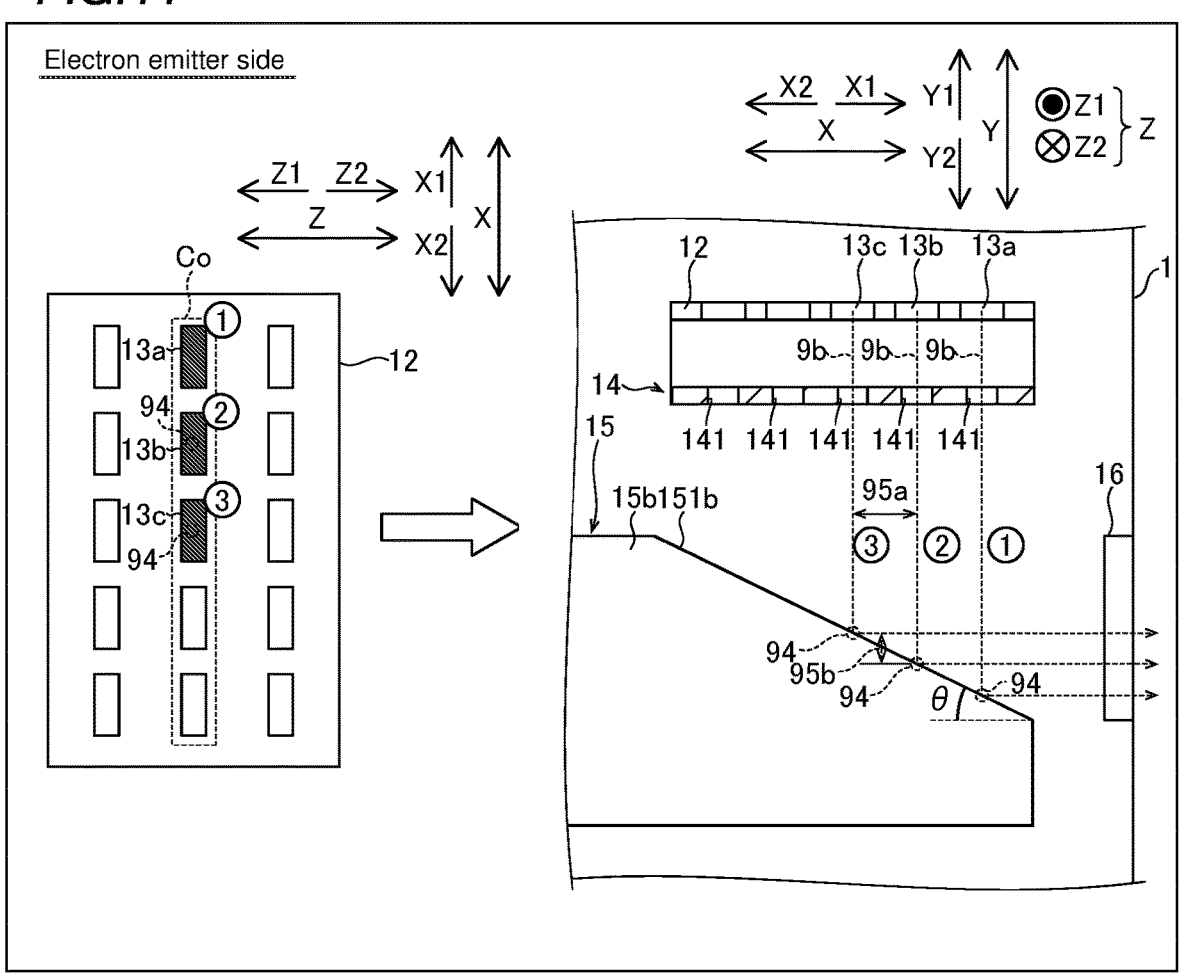
FIG. 11 is a schematic diagram showing a focal position on a side of certain electron emitters and a focal position on the inclined surface of the target in the case of imaging a small subject with the X-ray imaging apparatus according to the first embodiment.

FIG. 10 and FIG. 11 show an irradiation pattern in the case where the subject 90 is relatively small in size. In this case, in the case of an irradiation pattern corresponding to a small inspection target subject, which is small in size, as the subject 90, the imaging controller 8 is configured to perform control to cause electron beams 9b to be emitted from a plurality of adjacent certain electron emitters 13.

In one example shown in FIG. 11, initially (shown as "1" in FIG. 11), the imaging controller 8 is configured to perform control to cause the inclined surface 151b to emit X-rays 9a by causing certain electron emitters 13a arranged on the most X1-direction side to emit electron beams 9b, while rotating the subject 90. At this time, the image processing unit 5c is configured to acquire the detection signal detected by the detector 2 from the detector 2 at each of a plurality of preset imaging angles.

Next, secondary (shown as "2" in FIG. 11), the imaging controller 8 is configured to perform control to cause the inclined surface 151b to generate X-rays 9a by causing one electron emitter 13a arranged adjacent to the first certain electron emitter 13a on the X2-direction side to emit an electron beam 9b, while rotating the subject 90.

At this time, the image processing unit 5c is configured to acquire the detection signal detected by the detector 2 from the detector 2 at each of the preset plurality of imaging angles. Further, thirdly (shown as "3" in FIG. 11), the imaging controller 8 is configured to perform control to cause the inclined surface 151b to generate X-rays 9a by causing one electron emitter 13c arranged adjacent to the second electron emitter 13b on the X2-direction side to emit an electron beam 9b, while rotating the subject 90. At this time, the image processing unit 5c is configured to acquire the detection signal detected by the detector 2 from the detector 2 at each of the preset plurality of imaging angles.

In this case, the distance between the focal positions 94 is shortened to the distance 95b, so that the X-rays 9a can be irradiated in a similar irradiation range. Therefore, even in the case where the subject 90 is relatively small in size, it is possible for each of the plurality of emitted X-rays 9a to penetrate the subject 90 and hit the detector 2.

The image processing unit 5c performs the correction processing of the magnification rate change of the subject 90 in the X-ray image based on the detection signal and the correction processing of the position of the projected image of the subject 90 in the X-ray image based on the detection signal, based on the plurality of detection signals acquired in the above processing, and the reconstruction processing information including the information on the focal position 94 of the electron beam 9b emitted from one electron emitter 13 on the inclined surface 151b, the SRD information, and the SDD information, which are associated with each of the plurality of detection signals.

Here, the SRD information is the distance from the focal position 94 on the inclined surface 151b to the rotation center axis 91 of the rotation mechanism 4. The SDD information is the distance from the focal position 94 on the inclined surface 151b to the position of the detection surface of the detector 2. The distance to the position of the rotation center axis 91 of the rotation mechanism 4 has been registered in advance in the storage unit 5b. The position of the detection surface of the detector 2 has been registered in advance in the storage unit 5b. The image processing unit 5c is configured to generate a CT image by performing reconstruction processing based on each of the plurality of corrected X-ray images.

<In the Case of Slightly Large (Medium-Sized) Subject>

Figure 12:
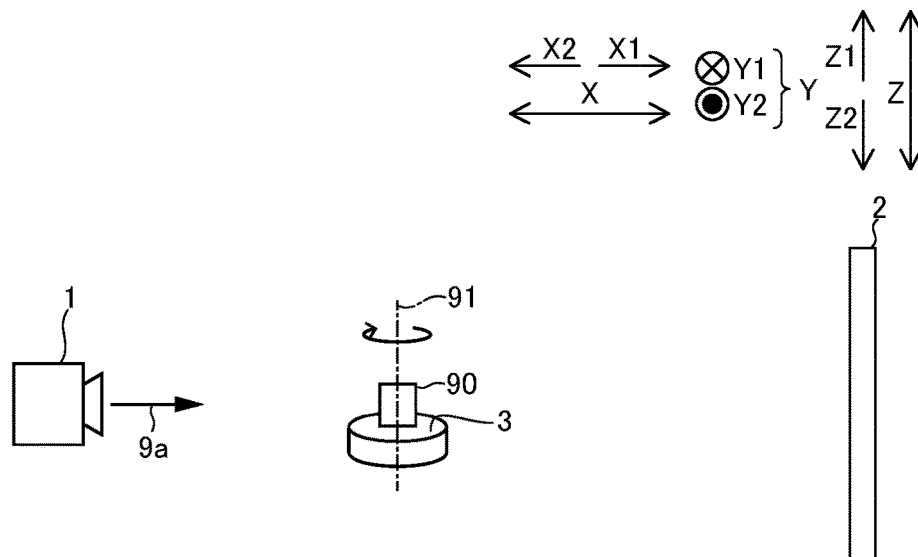
FIG. 12 is a schematic diagram showing a case of imaging a medium-sized subject with the X-ray imaging apparatus according to the first embodiment.
Figure 13:
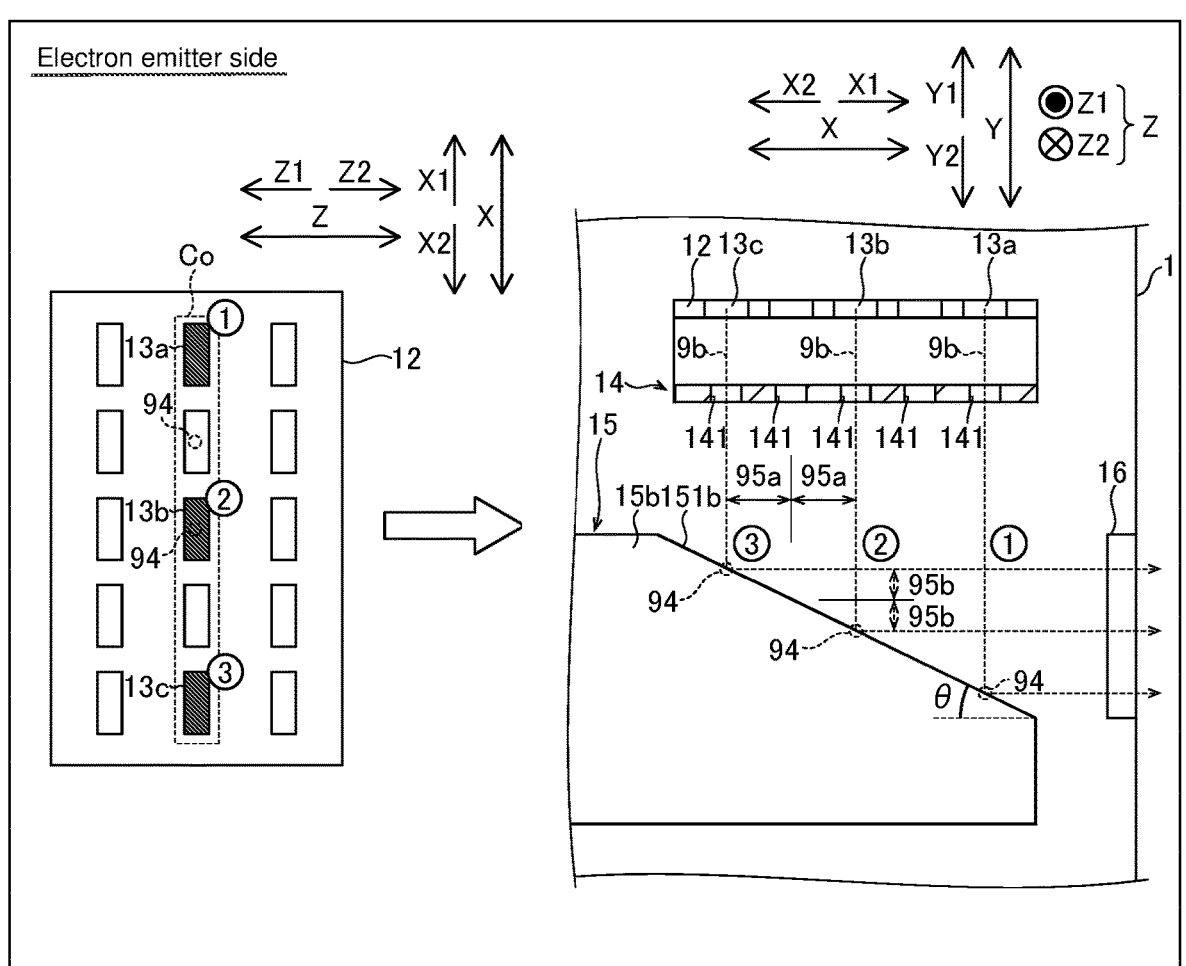
FIG. 13 is a schematic diagram showing a focal position on a side of certain electron emitters and focal positions on the inclined surface of the target, in the case of imaging a medium-sized subject with the X-ray imaging apparatus according to the first embodiment.

FIG. 12 and FIG. 13 show an irradiation pattern in the case where the size of the subject 90 is slightly large (medium size). In this case, in the case of an irradiation pattern corresponding to a medium-sized inspection target subject, which is slightly large in size, as the subject 90, the imaging controller 8 is configured to perform control to cause one electron emitter 13 arranged at least every other out of the plurality of certain electron emitters 13 to emit an electron beam 9b. With this, the distance between the focal positions 94 on the inclined surface 151b becomes twice the distance 95b. Note that the medium-sized inspection target subject is one example of the "large inspection target subject" as recited in claims.

In one example shown in FIG. 13, initially (shown as "1" in FIG. 13), the imaging controller 8 is configured to perform control to cause the inclined surface 151b to generate X-rays 9a by causing one electron emitter 13a arranged on the most X1-direction side to emit an electron beam 9b, while rotating the subject 90. At this time, the image processing unit 5c is configured to acquire the detection signal detected by the detector 2 from the detector 2 at each of the preset plurality of imaging angles.

Next, secondary (shown as "2" in FIG. 13), the imaging controller 8 is configured to perform control to cause the inclined surface 151b to generate X-rays 9a by causing one electron emitter 13b arranged with one skipped from the first electron emitter 13a on the X2-direction side, while rotating the subject 90.

At this time, the image processing unit 5c is configured to acquire the detection signal detected by the detector 2 from the detector 2 at each of the preset plurality of imaging angles. Further, thirdly (shown as "3" in FIG. 13), the imaging controller 8 is configured to perform control to cause the inclined surface 151b to generate X-rays 9a by causing one electron emitter 13c arranged with on skipped from the second electron emitter 13b on the X2-direction side, while rotating the subject 90. At this time, the image processing unit 5c is configured to acquire the detection signal detected by the detector 2 from the detector 2 at each of the preset plurality of imaging angles.

In this case, the distance between the focal positions 94 is twice the distance 95b, so the overlapping range between the irradiation ranges can be made relatively small. The processing of generating a CT image is the same as that described above, so the description will be omitted.

<In the Case of Large Subject>

Figure 14:
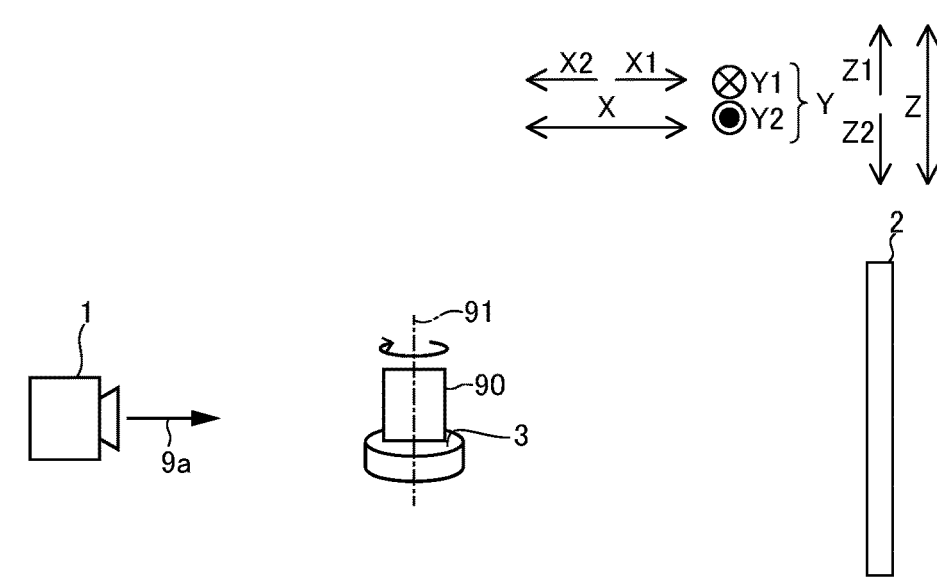
FIG. 14 is a schematic diagram showing a case of imaging a large subject with the X-ray imaging apparatus according to the first embodiment.
Figure 15:
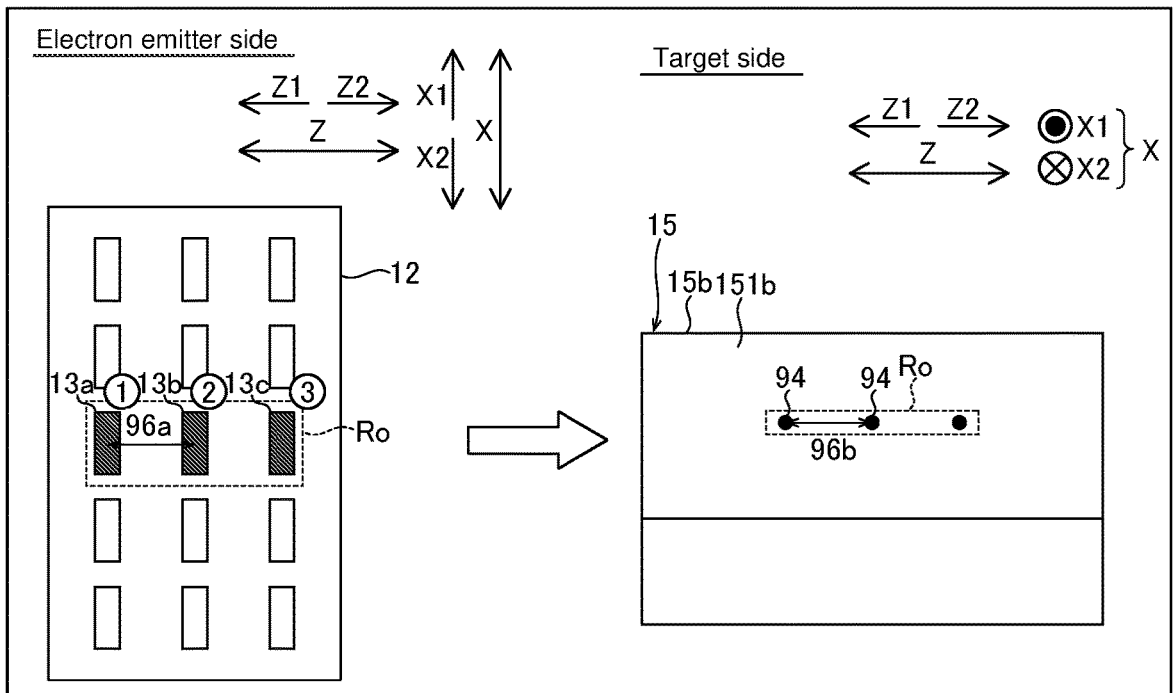
FIG. 15 is a schematic diagram showing focal positions on a side of other electron emitters and focal positions on the inclined surface of the target, in the case of imaging a large subject by the X-ray imaging apparatus according to the first embodiment.

FIG. 14 and FIG. 15 show an irradiation pattern in the case where the subject 90 is relatively large in size. In this case, in the case of an irradiation pattern corresponding to a large inspection target subject, which is large in size, as the subject 90, the imaging controller 8 is configured to perform control to cause a plurality of other electron emitters 13 to emit electron beams 9b. With this, the distance between the focal positions 94 on the inclined surface 151b becomes the distance 96b.

In the example shown in FIG. 15, initially (shown as "1" in FIG. 15), the imaging controller 8 is configured to perform control to cause the inclined surface 151b to emit X-rays 9a by causing one other electron emitter 13a located on the most Z1-direction side to emit an electron beam 9b, while rotating the subject 90. At this time, the image processing unit 5c is configured to acquire the detection signal detected by the detector 2 from the detector 2 at each of the preset plurality of imaging angles.

Next, secondary (shown as "2" in FIG. 15), the imaging controller 8 is configured to perform control to cause the inclined surface 151b to generate X-rays 9a by causing one other electron emitter 13a arranged adjacent to the first other electron emitter 13a on the Z2-direction side to emit an electron beam 9b, while rotating the subject 90.

At this time, the image processing unit 5c is configured to acquire the detection signal detected by the detector 2 from the detector 2 at each of the preset plurality of imaging angles. Next, thirdly (shown as "3" in FIG. 15), the imaging controller 8 is configured to perform control to cause the inclined surface 151b to generate X-rays 9a by causing one other electron emitter 13c arranged adjacent to the second other electron emitter 13b on the Z2-direction side to emit an electron beam 9b, while rotating the subject 90. At this time, the image processing unit 5c is configured to acquire the detection signal detected by the detector 2 from the detector 2 at each of the preset plurality of imaging angles.

In this case, the distance between the focal positions 94 is the distance 96b, so the overlapping range between the irradiation ranges can be made relatively small. The processing of generating a CT image is the same as that described above, so the description will be omitted.

Effects of First Embodiment

In this embodiment, the following effects can be obtained.

In the first embodiment, as described above, the X-ray imaging apparatus 100 is provided with the imaging controller 8 configured to cause X-rays to be emitted so that the distance 95b (and 96b) between the plurality of focal positions 94 of the plurality of electron beams 9b on the inclined surface 151b differs as viewed from the subject 90 side, depending on the size of the subject 90, by causing a part of the plurality of electron emitters 13 to emit X-rays 9a.

With this, by causing the X-rays 9a to be emitted such that the distance 95b (and the distance 96b) between the plurality of focal positions 94 differs depending on the size of the subject 90, in the case where the subject 90 is relatively small in size, it is possible to reduce the distance (distance 95b) between the focal positions 94 on the inclined surface 151b of the target 15b in accordance with the size of the subject 90. Therefore, it is possible to make the plurality of X-rays 9a separately generated on the target 15b by each of the plurality of electron beams 9b penetrate the subject 90 and hit the detector 2. With this, the image of the subject 90 can be assuredly acquired.

Further, in the case where the subject 90 is relatively large in size, it is possible to increase the distance (distance 96b) between the focal positions 94 on the target 15b of the electron beam 9b. Therefore, the detection range of the detector for the X-rays R generated from each of the plurality of electron beams Er can be prevented from becoming the same. Therefore, the positional deviation between the acquired X-ray images can be suppressed. Consequently, it is possible to suppress the blurring of the subject 90 in the image reconstructed from the X-ray images reflecting the subject 90. As a result, it is possible to assuredly acquire the image of the subject 90 and suppress the blurring of the subject 90 in the reconstructed image.

In the first embodiment, as described above, based on each irradiation pattern of the plurality of electron emitters 13 according to the size of the subject 90, the imaging controller 8 is configured to perform control to cause an electron beam 9b to be emitted from at least a plurality of certain electron emitters 13 arranged linearly in the X1-direction (irradiation direction) of the X-rays 9a traveling from the inclined surface 151b toward the subject 90 as an X-direction (first direction) and a plurality of other electron emitters 13 arranged linearly in a direction orthogonal to the X1-direction (irradiation direction) as the Z-direction (second direction).

Here, based on the irradiation patterns of the plurality of certain electron emitters 13 and the plurality of other electron emitters 13, X-rays 9a are emitted such that the distance 95b (and distance 96b) between the plurality of focal positions 94 of the plurality of electron beams 9b on the inclined surface 151b differs.

This achieves the configuration that the distance (distance 95b and distance 96b) between the plurality of focal positions 94 is differentiated only by changing the irradiation patterns of the plurality of certain electron emitters 13 and the plurality of other electron emitters 13. Therefore, the distance between the plurality of focal positions 94 can be differentiated even without performing the control to shift the focal position from the center position by using the focusing unit 14. As a result, the aberration of the electron beam 9b caused by the control to shift the focal position 94 can be suppressed. In addition, there is no need to individually provide lens portions 141 in the focusing unit 14 to match the distance (distance 95b and distance 96b) between a plurality of different focal positions 94. Therefore, it is possible to suppress the increase in the required number of lens portions 141.

Further, in the first embodiment, as described above, in the case of an irradiation pattern according to a small inspection target subject, which is small in size, as the subject 90, the imaging controller 8 is configured to perform control to cause a plurality of certain electron emitters 13 adjacent to each other to emit electron beams 9b. Here, the plurality of certain electron emitters 13 is arranged along the inclined direction of the inclined surface 151b. Therefore, in the case where the inclined angle θ of the inclined surface 151b is small (e.g., less than 45 degrees, etc.), the distance 95b between the focal positions 94 of the electron beams 9b emitted from the plurality of adjacent certain electron emitters 13 on the inclined surface 151b in the direction traveling from the electron emitter 13 toward the inclined surface 151b becomes smaller than the distance 95a between the focal positions 94 of the plurality of certain electron emitters 13 on the substrate 12.

With this, it is possible to cause the plurality of X-rays 9a generated separately from the target 15b by each of the plurality of electron beams 9b to be emitted in a similar irradiation range. As a result, it is possible to ensure that each of the plurality of X-rays 9a hits the subject 90 as a small inspection target subject.

In the first embodiment, as described above, in the case of an irradiation pattern according to a large imaging target, which is large in size, as the subject 90, the imaging controller 8 is configured to perform control to cause the electron beam 9b to be emitted by at least any one of the plurality of other electron emitters 13 and the electron emitters 13 arranged every other out of the plurality of certain electron emitters 13.

Here, the plurality of other electron emitters 13 is not aligned along the inclined surface 151b but is aligned linearly in the Z-direction orthogonal to the inclined direction. Therefore, the distance 96b between the plurality of other electron emitters 13 on the inclined surface 151b does not decrease according to the inclined angle θ. With this, as compared with the distance 95b between focal positions 94 of a plurality of adjacent certain electron emitters 13, it is possible to increase the distance between the focal positions 94. As a result, it is possible to prevent the detection range of the detector 2 for the X-rays R generated from each of the plurality of electron beams Er from becoming the same. Therefore, in the case of reconstructing a plurality of X-ray images, it is possible to suppress the positional deviation between the acquired X-ray images.

Further, by causing the electron beam 9b to be emitted from certain electron emitters 13 arranged at least every other out of the plurality of certain electron emitters 13, it is possible to increase the distance between the focal positions 94, as compared with the distance 95a between the focal positions 94. Therefore, it is possible to prevent the detection range in the detector 2 for the X-rays R generated from each of the plurality of electron beams Er from becoming the same. As a result, when reconstructing a plurality of images, it is possible to suppress the positional deviation between the acquired X-ray images.

Further, in the first embodiment, as described above, each of the plurality of electron emitters 13 has a plurality of cone-shaped electron sources 131 arranged to form a rectangular shape with the X1-direction (irradiation direction) as the longitudinal direction, as viewed from the target 15b side. Each of the plurality of electron emitters 13 has a gate electrode that generates an electric field to emit electrons from each of the plurality of cone-shaped electron sources 131.

With this, by arranging each of the plurality of cone-shaped electron sources 131 to form a rectangular shape, as compared with the case in which each of the plurality of cone-shaped electron sources 131 is arranged in a square shape, it is possible to arrange more electron emitters 13 in the direction of the short side. As a result, it is possible to secure the degree of freedom in setting the distance 96b between the plurality of focal positions 94 of the plurality of electron beams 9b emitted separately from each of the plurality of other electron emitters 13 on the target 15b.

Further, in the first embodiment, as described above, the target 15b is configured to rotate about the rotation center axis 92 that extends in a direction in which the focusing unit 14 and the target 15b are aligned. The imaging controller 8 is configured to perform control to cause at least any one of the plurality of certain electron emitters 13 and the plurality of other electron emitters 13 to emit electron beams 9b, based on the irradiation pattern, while rotating the target 15b.

With this, as compared with the case where the plurality of cone-shaped electron sources 131 is arranged in a square shape, the electron beam 9b emitted from each of the plurality of cone-shaped electron sources 131 arranged in a rectangular shape becomes smaller in width in the rotation direction on the target 15b. Therefore, it is possible to secure the distance on the inclined surface 151b in the irradiation direction where the electron beam 9b is again emitted. As a result, the temperature of the target 15b can be lowered during the time until the electron beam 9b is emitted again, thus suppressing the melting of the target 15b.

Further, in the first embodiment, as described above, the X-ray tube 1 includes the X-ray transmission window 16 through which the X-rays 9a emitted from the target 15b pass. The plurality of focal positions 94 on the inclined surface 151b is provided to be within the X-ray transmission window 16 when viewed from the subject 90 side. This ensures that the most intense X-rays 9a, which is emitted from the focal position 94, are emitted to the subject 90, thus ensuring the intensity of the X-rays 9a that hit the subject 90.

Further, in the first embodiment, as described above, the focusing unit 14 is provided with a plurality of lens portions 141 arranged to respectively face the plurality of electron emitters 13 arranged in the X1-direction (irradiation direction) of the X-rays 9a traveling from the inclined surface 151b toward the subject 90 as the X-direction (first direction) of the plurality of electron emitters 13 arranged linearly in each of the X-direction (first direction) and the Z-direction (second direction). With this, as compared with the case in which electron beams 9b emitted from the plurality of lens portions 141 are individually focused to a plurality of focal positions 94 by a single lens portion 141, since the electron beam 9b is individually focused to each of the plurality of focal positions 94, the generation of aberrations of the electron beam 9b on the inclined surface 151b can be suppressed.

Second Embodiment

Referring to FIG. 16 to FIG. 21, the configuration of an X-ray imaging apparatus 200 according to a second embodiment will be described. In the second embodiment, in the X-ray imaging apparatus 200, a plurality of electron emitters 13 is formed on the Y2-direction side surface of the substrate 212 in accordance with a subject 90, which is even larger in size. Note that in the second embodiment, for the same configuration as in the first embodiment, the detailed explanations will be omitted.

Referring to FIG. 16 to FIG. 21, the configuration of an X-ray imaging apparatus 200 according to a second embodiment of the present disclosure will be described.

Figures 16, 17:
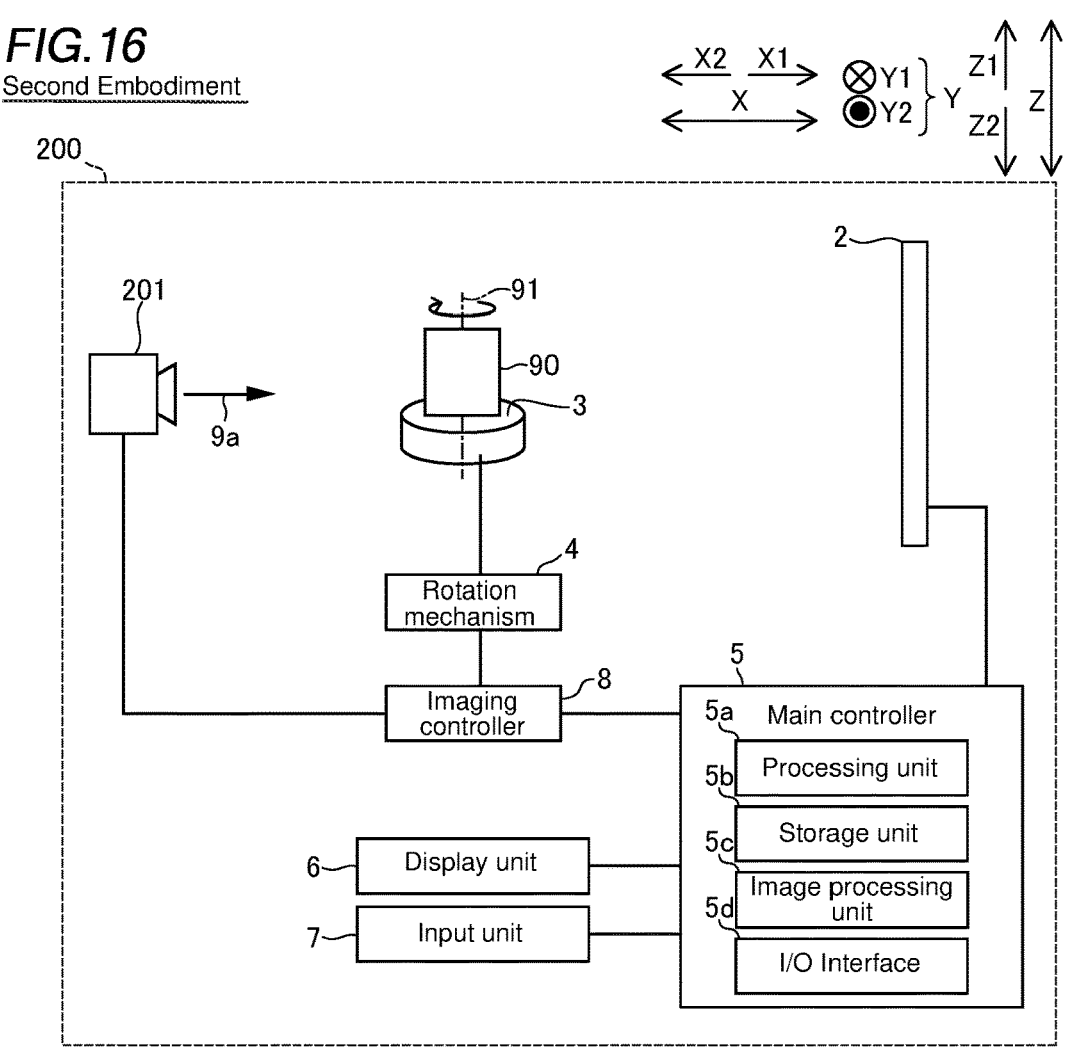
FIG. 16 is a schematic diagram of the overall configuration of an X-ray imaging apparatus according to a second embodiment.
FIG. 17 is a schematic diagram showing a plurality of electron emitters on a substrate of the X-ray imaging apparatus according to the second embodiment.

As shown in FIG. 16, the X-ray imaging apparatus 200 is an apparatus for capturing a CT image of a subject 90. The X-ray imaging apparatus 200 is equipped with an X-ray tube 201, a detector 2, a subject installation portion 3, a rotation mechanism 4, a main controller 5, a display unit 6, an input unit 7, and an imaging controller 8. Note that the imaging controller 8 is one example of the "controller" as recited in claims.

Here, the direction in which the X-ray tube 1 and the detector 2 are arranged is defined as an X-direction, the direction toward the detector 2 in the X-direction is defined as an X1-direction, and the direction toward the X-ray tube 1 in the X-direction is defined as an X2-direction. The vertical direction is defined as a Z-direction, the upward direction in the Z-direction is defined as a Z1-direction, and the downward direction in the Z-direction is defined as a Z2-direction. The X-direction and the Z-direction are orthogonal to each other. The direction orthogonal to the X-direction and the Z-direction is defined as a Y-direction, one direction in the Y-direction is defined as a Y1-direction, and the other direction in the Y-direction is defined as a Y2-direction.

Note that the X-direction is one example of the "first direction" recited in claims. Note that the Z-direction is one example of the "second direction" recited in claims. Note that the X1-direction is one example of the "irradiation direction" recited in claims.

(Configuration of X-ray Tube)

As shown in FIG. 17, the X-ray tube 201 includes a vacuum container 11 (see FIG. 2), a substrate 212, a plurality of electron emitters 13, a focusing unit (not illustrated), a rotary target 15 (see FIG. 2), an X-ray transmission window 16 (see FIG. 2), and a collimator 17 (see FIG. 2).

A plurality (40 in this embodiment) of electron emitters 13 is formed on the Y2-direction side surface of the substrate 212. Note that two to four, or 6 more more electron emitters 13 may be formed on the surface of the substrate 212 in the Z-direction. Further, two to seven, or nine or more electron emitters 13 may be formed on the surface of the substrate 212 in the X-direction.

(Detailed Configuration of Imaging Controller)

As shown in FIG. 17, the imaging controller 8 of the second embodiment is configured to perform control to cause X-rays 9a to be emitted such that the distance between the plurality of focal positions 94 on the inclined surface 151b (the distance 95b in FIG. 8 and the distance 96b in FIG. 9) as viewed from the subject 90 (as viewed from the X1-direction side) differs depending on the size of the subject 90, by causing a part of the plurality of electron emitters 13 to emit electron beams 9b.

In other words, the imaging controller 8 is configured to perform control to cause at least one of the plurality of certain electron emitters 13 arranged in the X-direction and the plurality of other electron emitters 13 arranged in the Z-direction to emit electron beams 9b, based on an irradiation pattern included in the irradiation control information transmitted from the X-ray tube 201, while rotating the target 15b.

<Irradiation Pattern>

Next, referring to FIG. 18 to FIG. 21, the distance between the plurality of focal positions 94 differs in the irradiation pattern according to the size of the subject 90 will be described.

<In the Case of Large Subject>

Figure 18:
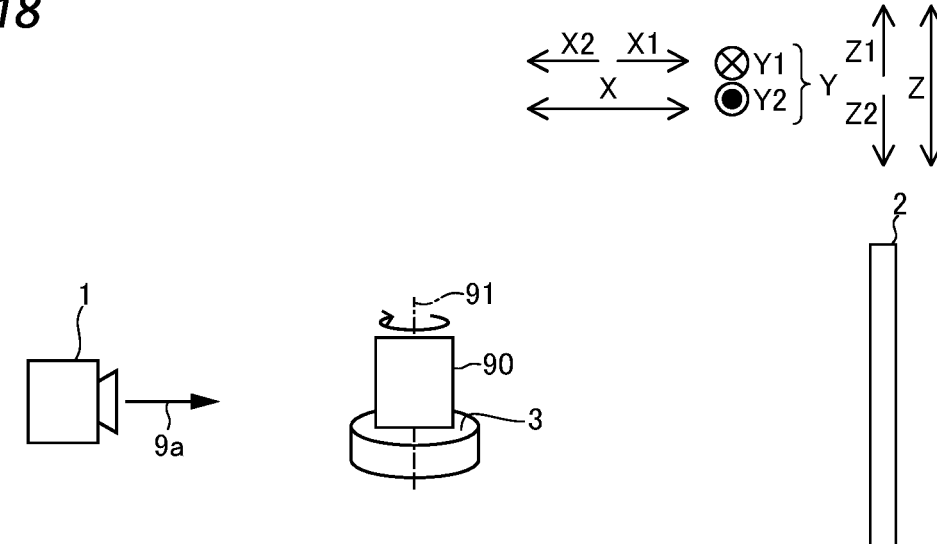
FIG. 18 is a schematic diagram showing a case of imaging a large subject with the X-ray imaging apparatus according to the second embodiment.
Figure 19:
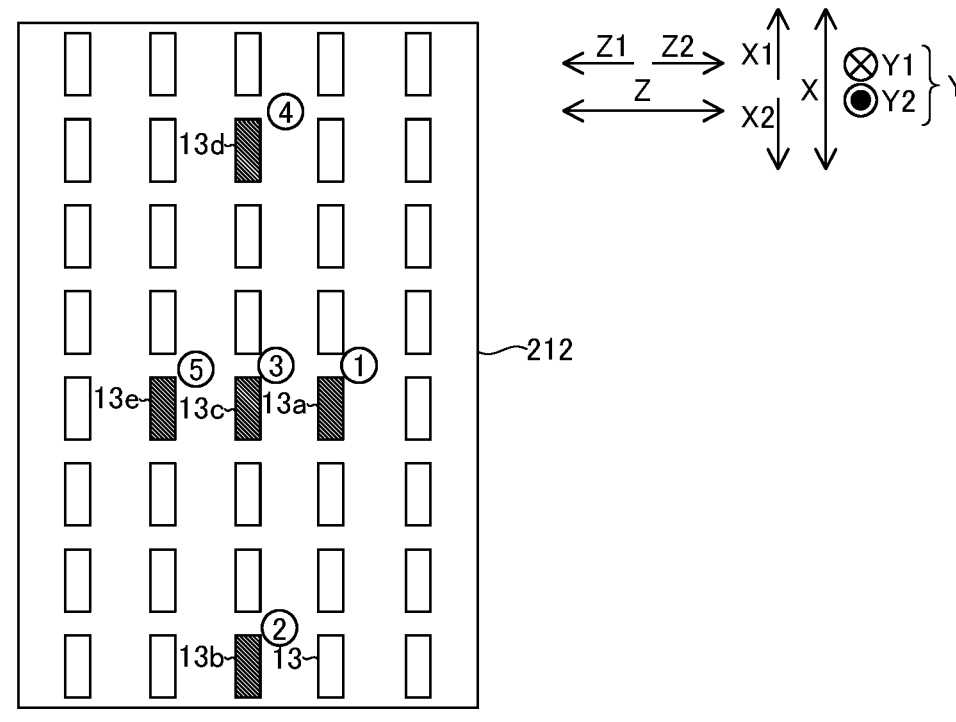
FIG. 19 is a schematic diagram showing an irradiation pattern on the sides of certain electron emitters and other electron emitters, in the case of imaging a fairly large subject with the X-ray imaging apparatus according to the second embodiment.

FIG. 18 and FIG. 19 show an irradiation pattern in the case where the subject 90 is relatively large in size. In this case, in the case of an irradiation pattern corresponding to a large inspection target subject, which is large in size, as the subject 90, the imaging controller 8 is configured to perform control to cause both a plurality of other electron emitters 13 and a plurality of certain electron emitters 13 arranged at least every other to emit electron beams 9b.

In one example shown in FIG. 19, initially (shown as "1" in FIG. 19), the imaging controller 8 is configured to perform control to cause the inclined surface 151b to generate X-rays 9a by causing the other electron emitter 13a to emit an electron beam 9b, while rotating the subject 90. At this time, the image processing unit 5c is configured to acquire the detection signal from the detector 2.

Next, secondary (shown in "2" in FIG. 19), the imaging controller 8 is configured to perform control to cause the inclined surface 151b to generate X-rays 9a by causing one electron emitter 13b in a row adjacent to the first other electron emitter 13a on the Z1-direction side and arranged at the end on the X2-direction side to emit an electron beam 9b, while rotating the subject 90.

At this time, the image processing unit 5c is configured to acquire the detection signal from the detector 2. Further, thirdly (shown in "3" in FIG. 90), the imaging controller 8 is configured to perform control to cause the inclined surface 151b to emit X-rays 9a by causing the other electron emitter 13c, which is in the same row as the second certain electron emitter 13b and adjacent to the first other electron emitter 13 to emit an electron beam 9b, while rotating the subject 90. At this time, the image processing unit 5c is configured to acquire the detection signal from the detector 2.

Further, fourthly (shown in "4" in FIG. 19), the imaging controller 8 is configured to perform control to cause the inclined surface 151b to generate X-rays 9a by causing the certain electron emitter 13d to emit an electron beam 9b, the certain electron emitter 13d being in the same row as the third certain electron emitter 13c and arranged at a position away from the third other electron emitter 13d by two emitters, while rotating the subject 90. At this time, the image processing unit 5c is configured to acquire the detection signal from the detector 2.

Next, fifthly (shown in "5" in FIG. 19), the imaging controller 8 is configured to perform control to cause the inclined surface 151b to generate X-rays 9a by causing the other electron emitter 13e, which is adjacent to the third other electron emitter 13c, to emit an electron beam 9b, while rotating the subject 90. At this time, the image processing unit 5c is configured to acquire the detection signal from the detector 2.

<In the Case of Extra-Large Subject>

Figures 20, 21:
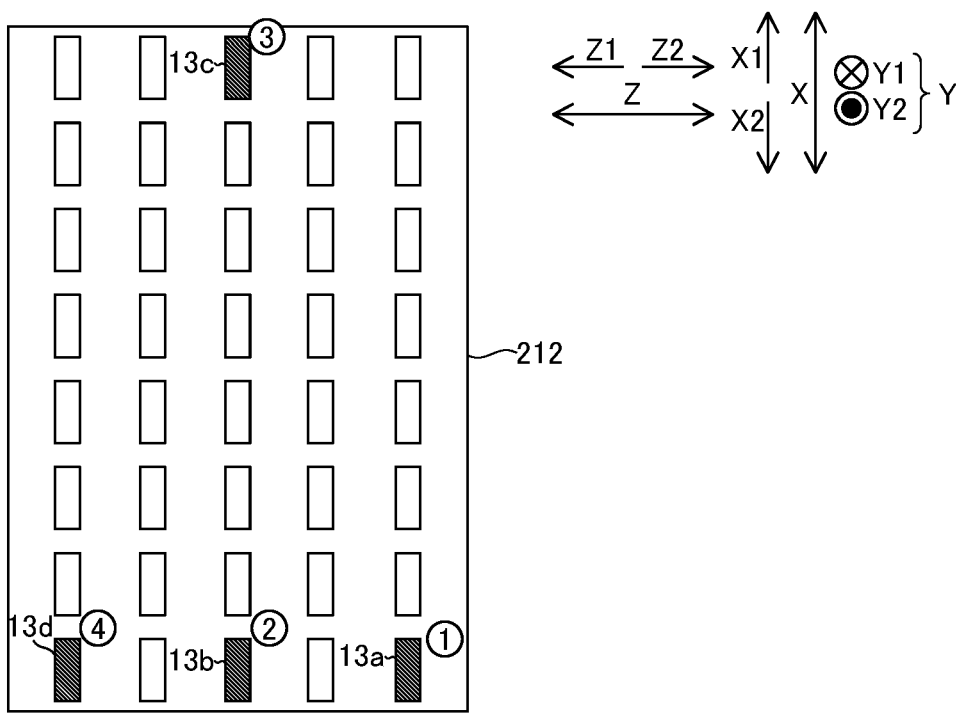
FIG. 20 is a schematic diagram showing the case of imaging an extra-large subject with the X-ray imaging apparatus according to the second embodiment.
FIG. 21 is a schematic diagram showing an irradiation pattern on the sides of certain electron emitters and other electron emitters, in the case of imaging an extra-large subject with the X-ray imaging apparatus according to the second embodiment.

FIG. 20 and FIG. 21 show an irradiation pattern in the case where the subject 90 is extra large in size. In this case, in the case of an irradiation pattern corresponding to an extra-large inspection target subject, which is extra large in size, as the subject 90, the imaging controller 8 is configured to perform control to cause both of a plurality of other electron emitters 13 and a plurality of certain electron emitters 13 arranged every other out of the plurality of electron emitter to emit an electron beam 9b.

In one example shown in FIG. 21, initially (shown in "1" in FIG. 21), the imaging controller 8 is configured to perform control to cause the inclined surface 151b to generate X-rays 9a by causing the first other electron emitter 13a to emit an electron beam 9b, while rotating the subject 90. At this time, the image processing unit 5c is configured to acquire the detection signal from the detector 2.

Next, secondary (shown as 2 in FIG. 21), the imaging controller 8 is configured to perform control to cause the inclined surface 151b to generate X-rays 9a by causing the other electron emitter 13a arranged at a position away from the first other electron emitter 13a by one electron emitter, while rotating the subject 90.

At this time, the image processing unit 5c is configured to acquire the detection signal from the detector 2. Next, thirdly (shown as "3" in FIG. 21), the imaging controller 8 is configured to perform control to cause the inclined surface 151b to generate X-rays 9a by causing a certain electron emitter 13c arranged at the X1-direction end of the same row as the second certain electron emitter 13b, while rotating the subject 90. At this time, the image processing unit 5c is configured to acquire the detection signal from the detector 2.

Next, fourthly (shown as 4 in FIG. 21), the imaging controller 8 is configured to perform control to cause the inclined surface 151b to generate X-rays 9a by causing the other emitter 13d arranged one position away from the second other electron emitter 13b to emit an electron beam 9b, while rotating the subject 90. At this time, the image processing unit 5c is configured to acquire the detection signal from the detector 2.

Note that the other configurations of the second embodiment are the same as those of the first embodiment, and the description will be omitted. Note that the other effects of the second embodiment are the same as that in the first embodiment.

Effects of Second Embodiment

In the second embodiment, the following effects can be obtained.

In the first embodiment, as described above, the X-ray imaging apparatus 200 is provided with the imaging controller 8 which cause X-rays 9a to be emitted such that the distance 95b (and the distance 96b) of the plurality of electron beams 9b between the plurality of focal positions 94 on the inclined surface 151b differs as viewed from the subject 90 side, depending on the size of the subject 90, by causing a part of the plurality of electron emitters 13 to emit electron beams 9b. As a result, it is possible to assuredly acquire the image of the subject 90 and suppress the blurring of the subject 90 in the reconstructed image. Note that the other configurations of the second embodiment are the same as those of the first embodiment, and the description will be omitted.

<Modifications>

Note that the embodiments disclosed here should be considered illustrative and not restrictive in all respects. It should be noted that the scope of the present disclosure is indicated by claims and is intended to include all modifications (modified examples) within the meaning and scope of the claims and equivalents.

Figure 22:
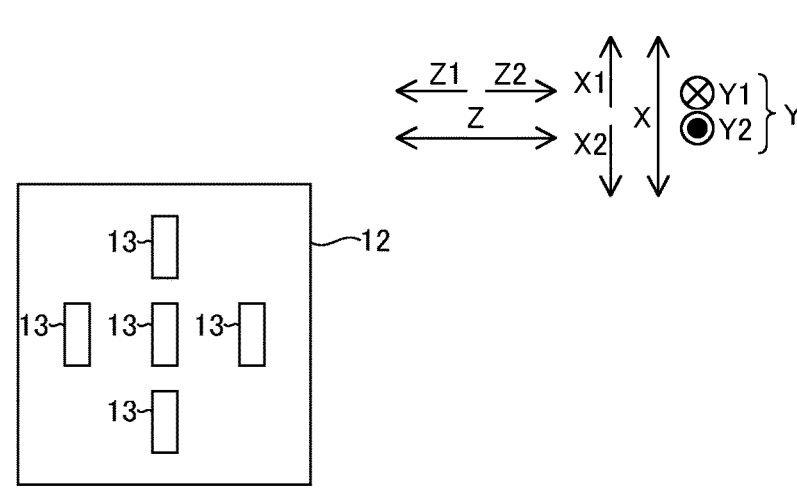
FIG. 22 is a schematic diagram showing a plurality of electron emitters on a substrate of an X-ray imaging apparatus according to a modification of the first and second embodiments.

For example, in the first and second examples described above, an example is shown in which the plurality of electron emitters 13 is arranged in a matrix as viewed from the Y1-direction side, but the present disclosure will not be limited thereto. In the present disclosure, as shown in the modification shown in FIG. 22, the plurality of electron emitters 13 may be arranged in a cross-like pattern when viewed from the Y1-direction side.

In the first and second embodiments described above, an example is shown in which the rotary target 15 is provided with the rotation driving mechanism 15a (see FIG. 2) and the target 15b. However, in the present disclosure, the target is not required to be rotated.

Further, in the first and second examples described above, an example is shown in which the X-ray imaging apparatus 100 (200) is used for non-destructive inspection, for example, but the present disclosure is not limited thereto. In the present disclosure, the X-ray imaging apparatus may be used for applications other than non-destructive inspection applications, for example.

Further, in the first and second examples, as described above, an example is shown in which each of the plurality of electron emitters 13 has a plurality of cone-shaped electron sources 131 arranged in a rectangular shape with the X1-direction (irradiation direction) as the first direction, as viewed from the target 15b side, but the present disclosure is not limited thereto. In the present disclosure, the plurality of electron emitters may be arranged in an elliptical shape with the irradiation direction as the longitudinal direction when viewed from the target side. In this case, the lens portion of the focusing unit is circular in shape, which facilitates the focusing of an electron beam emitted from each of the plurality of lens portions.

Aspects

It would be understood by those skilled in the art that the exemplary embodiments described above are specific examples of the following aspects.

(Item 1)

An X-ray imaging apparatus (100, 200) includes:

an X-ray tube 1 including a plurality of electron emitters 13, a focusing unit 14, and a target 15*b*, the plurality of electron emitters 13 each having an electron source 131 for emitting an electron beam 9*b*, the plurality of electron emitters 13 being arranged linearly in each of a first direction (X-direction) and a second direction (Z-direction) orthogonal to the first direction (X-direction) on a substrate 12 (212), the focusing unit 14 being configured to focus each of a plurality of electron beams 9*b* emitted separately from the plurality of electron emitters 13, the target 15*b* having an inclined surface 151*b* inclined to emit X-rays 9*a* generated by each of the plurality of electron beams 9*b* focused onto a plurality of separate focal positions 94 by the focusing unit 14, a detector 2 configured to detect the X-rays 9*a* emitted from the X-ray tube 1 and transmitted through the subject 90;

an image processing unit 5*c* configured to generate an image based on a detection signal output from the detector 2; and a controller (imaging controller 8) configured to cause X-rays 9*a* to be emitted such that a distance 95*b* between the plurality of focal positions 94 of the plurality of electron beams 9*b* on the inclined surface 151*b* differs as viewed from a subject 90's side, depending on a size of the subject 90, by causing a part of the plurality of electron emitters 13 to emit electron beams 9*b*.

(Item 2)

In the X-ray imaging apparatus 100 (200) as recited in the above-described Item 1, the controller (imaging controller 8) is configured to perform control to cause at least one of a plurality of certain electron emitters 13 arranged linearly in an irradiation direction (X1-direction) of X-rays 9*a* traveling from the inclined surface 151*b* toward the subject 90 as a first direction (X-direction) and a plurality of other electron emitters 13 arranged linearly in a direction orthogonal to the irradiation direction (X1-direction) as a second direction (Z-direction), as a part of the plurality of electron emitters 13 arranged linearly in each of the first direction (X-direction) and the second direction (Z-direction), to emit electron beams 9*b*, based on an irradiation pattern of the plurality of electron emitters 13 according to a size of the subject 90.

(Item 3)

In the X-ray imaging apparatus as recited in the above-described Item 2, in a case of an irradiation pattern corresponding to a small inspection target subject which is small in size as the subject 90, the imaging controller (imaging controller 8) is configured to perform control to cause a plurality of certain electron beams arranged adjacently to emit an electron beam 9*b*.

(Item 4)

In the X-ray imaging apparatus 100 (200) as recited in the above-described Item 2, in a case of the irradiation pattern corresponding to a large inspection target subject which is large in size as the subject 90, the controller (imaging controller 8) is configured to perform control to cause at least any one of the plurality of other electron emitters 13 and the plurality of certain electron emitters 13 arranged every other out of the plurality of certain electron emitters 13 to emit an electron beam 9*b*.

(Item 5)

In the X-ray imaging apparatus 100 (200) as recited in the above-described Item 2, each of the plurality of electron emitters 13 includes:

a plurality of cone-shaped electron sources 131 arranged to form a rectangular shape or an oval shape with the irradiation direction (X1-direction) as a longitudinal direction, as viewed from a side of the target 15*b*; and a gate electrode configured to generate an electric field to cause each of the plurality of cone-shaped electron sources 131 to emit an electron.

(Item 6)

In the X-ray imaging apparatus 100 (200) as recited in the above-described Item 5, the target 15*b* is configured to rotate about a rotation center axis 92 extending in a direction in which the focusing unit 14 and the target 15*b* are arranged, and the controller (imaging controller 8) is configured to perform control to cause at least one of the plurality of certain electron emitters 13 and the plurality of other electron emitters 13 to emit electron beams 9*b*, based on the irradiation pattern, while rotating the target 15*b*.

(Item 7)

In the X-ray imaging apparatus 100 as recited in the above-described Item 1, the X-ray tube 1 further includes an X-ray transmission window 16 through which X-rays 9*a* emitted from the target 15*b* pass, and the plurality of focal positions 94 on the inclined surface 151*b* is provided to be within the X-ray transmission window 16 as viewed from a side of the subject 90.

(Item 8)

In the X-ray imaging apparatus 100 (200) as recited in the above-described Item 1, the focusing unit 14 includes a plurality of lens portions 141 arranged to respectively face the plurality of certain electron emitters 13 arranged in an irradiation direction (X1-direction) of X-rays 9*a* traveling from the inclined surface 151*b* toward the subject 90 as a first direction (X-direction) out of the plurality of electron emitters 13 arranged linearly in each of the first direction (X-direction) and the second direction (Z-direction).

The invention claimed is:

1. An X-ray imaging apparatus comprising:

an X-ray tube including a plurality of electron emitters, a focusing unit, and a target, the plurality of electron emitters each having a plurality of electron sources for emitting electron beams, the plurality of electron emitters being arranged linearly on a substrate in each of a first direction and a second direction orthogonal to the first direction, the focusing unit being configured to focus each of a plurality of electron beams emitted separately from the plurality of electron emitters, the target having an inclined surface inclined to emit X-rays generated by each of the plurality of electron beams focused onto a plurality of separate-focal positions by the focusing unit;

a detector configured to detect the X-rays emitted from the X-ray tube and transmitted through a subject;

an image processing unit configured to generate an image based on a detection signal output from the detector; and a controller configured to cause X-rays to be emitted by causing a part of the plurality of electron emitters to emit electron beams, wherein electron emitters which emit electron beams among the plurality of electron emitters are configured to be changed depending on a size of the subject, so that the X-rays are emitted such that a distance between the plurality of focal positions of the plurality of electron beams on the inclined surface differs as viewed from a side of the subject depending on the size of the subject.

2. The X-ray imaging apparatus as recited in claim 1, wherein the controller is configured to perform control to cause at least one of a plurality of certain electron emitters arranged linearly in an irradiation direction of X-rays traveling from the inclined surface toward the subject as the first direction and a plurality of other electron emitters arranged linearly in a direction orthogonal to the irradiation direction as the second direction, as a part of the plurality of electron emitters arranged linearly in each of the first direction and the second direction, to emit electron beams, based on an irradiation pattern of the plurality of electron emitters according to the size of the subject.

3. The X-ray imaging apparatus as recited in claim 2, wherein, in a case of an irradiation pattern corresponding to a small inspection target subject which is small in size as the subject, the controller is configured to perform control to cause a plurality of certain electron emitters arranged adjacently to emit electron beams.

4. The X-ray imaging apparatus as recited in claim 2, wherein, in a case of an irradiation pattern corresponding to a large inspection target subject which is large in size as the subject, the controller is configured to perform control to cause at least one of the plurality of other electron emitters and a plurality of certain electron emitters arranged every other out of the plurality of certain electron emitters to emit electron beams.

5. The X-ray imaging apparatus as recited in claim 2, wherein each of the plurality of electron emitters includes:
a plurality of cone-shaped electron sources arranged to form a rectangular shape or an oval shape with the irradiation direction as a longitudinal direction, as viewed from a target's side; and
a gate electrode configured to generate an electric field to cause each of the plurality of cone-shaped electron sources to emit an electron.

6. The X-ray imaging apparatus as recited in claim 5, wherein the target is configured to rotate about a rotation center axis extending in a direction in which the focusing unit and the target are arranged, and
wherein the controller is configured to perform control to cause at least one of the plurality of certain electron emitters and the plurality of other electron emitters to emit electron beams, based on the irradiation pattern, while rotating the target.

7. The X-ray imaging apparatus as recited in claim 1, wherein the X-ray tube further includes an X-ray transmission window through which the X-rays emitted from the target pass, and
wherein the plurality of focal positions on the inclined surface is provided to be within the X-ray transmission window as viewed from the side of the subject.

8. The X-ray imaging apparatus as recited in claim 1, wherein the focusing unit includes a plurality of lens portions arranged to respectively face the plurality of certain electron emitters arranged in an irradiation direction of the X-rays traveling from the inclined surface toward the subject as the first direction out of the plurality of electron emitters arranged linearly in each of the first direction and the second direction.

9. An X-ray imaging method comprising:
an electron beams emitting step of emitting each of a plurality of electron beams separately from a plurality of electron emitters each having a plurality of electron sources for emitting electron beams, and being arranged linearly on a substrate in each of a first direction and a second direction orthogonal to the first direction;
an electron beams focusing step of focusing each of the plurality of electron beams emitted separately from the plurality of electron emitters on an inclined surface;
an X-rays emitting step of emitting X-rays generated by each of the plurality of electron beams focused onto a plurality of focal positions to a subject;
an X-ray detecting step of detecting the X-rays transmitted through the subject; and
an image generating step of generating an image based on a detection signal of the X-rays,
wherein in the electron beams emitting step, electron emitters which emit electron beams among the plurality of electron emitters are configured to be changed depending on a size of the subject, so that the X-rays are emitted such that a distance between the plurality of focal positions of the plurality of electron beams on the inclined surface differs as viewed from a side of the subject depending on the size of the subject in the X-rays emitting step.

10. An X-ray imaging apparatus comprising:
an X-ray tube including a plurality of electron emitters, a focusing unit, and a target, the plurality of electron emitters each having a plurality of electron sources for emitting electron beams, the plurality of electron emitters being arranged linearly on a substrate in each of a first direction and a second direction orthogonal to the first direction, the focusing unit being configured to focus each of a plurality of electron beams emitted separately from the plurality of electron emitters, the target having an inclined surface inclined to emit X-rays generated by each of the plurality of electron beams focused onto a plurality of focal positions by the focusing unit;
a detector configured to detect the X-rays emitted from the X-ray tube and transmitted through a subject;
an image processing unit configured to generate an image based on a detection signal output from the detector; and
a controller configured to cause X-rays to be emitted such that a distance between the plurality of focal positions of the plurality of electron beams on the inclined surface differs as viewed from a side of the subject, depending on a size of the subject, by causing a part of the plurality of electron emitters to emit electron beams based on an irradiation pattern depending on the size of the subject.

11. The X-ray imaging apparatus as recited in claim 10, wherein the controller is configured to perform control to cause at least one of a plurality of certain electron emitters arranged linearly in an irradiation direction of X-rays traveling from the inclined surface toward the subject as the first direction and a plurality of other electron emitters arranged linearly in a direction orthogonal to the irradiation direction as the second direction, as a part of the plurality of electron emitters arranged linearly in each of the first direction and the second direction, to emit electron beams, based on the irradiation pattern of the plurality of electron emitters according to the size of the subject.

12. The X-ray imaging apparatus as recited in claim 11, wherein, in a case of the irradiation pattern corresponding to a small inspection target subject which is small in size as the subject, the controller is configured to perform control to cause a plurality of certain electron emitters arranged adjacently to emit electron beams.

13. The X-ray imaging apparatus as recited in claim 11, wherein, in a case of the irradiation pattern corresponding to a large inspection target subject which is large in size as the subject, the controller is configured to perform control to cause at least one of the plurality of other electron emitters and a plurality of certain electron emitters arranged every other out of the plurality of certain electron emitters to emit electron beams.

14. The X-ray imaging apparatus as recited in claim 11, wherein each of the plurality of electron emitters includes:

a plurality of cone-shaped electron sources arranged to form a rectangular shape or an oval shape with the irradiation direction as a longitudinal direction, as viewed from a target's side; and a gate electrode configured to generate an electric field to cause each of the plurality of cone-shaped electron sources to emit an electron.

15. The X-ray imaging apparatus as recited in claim 14, wherein the target is configured to rotate about a rotation center axis extending in a direction in which the focusing unit and the target are arranged, and wherein the controller is configured to perform control to cause at least one of the plurality of certain electron emitters and the plurality of other electron emitters to emit electron beams, based on the irradiation pattern, while rotating the target.

16. The X-ray imaging apparatus as recited in claim 10, wherein the X-ray tube further includes an X-ray transmission window through which the X-rays emitted from the target pass, and wherein the plurality of focal positions on the inclined surface is provided to be within the X-ray transmission window as viewed from the side of the subject.

17. The X-ray imaging apparatus as recited in claim 10, wherein the focusing unit includes a plurality of lens portions arranged to respectively face the plurality of electron emitters arranged in an irradiation direction of the X-rays traveling from the inclined surface toward the subject as the first direction out of the plurality of electron emitters arranged linearly in each of the first direction and the second direction.

* * * * *